United States Patent
Elshafie et al.

(10) Patent No.: US 12,376,179 B2
(45) Date of Patent: Jul. 29, 2025

(54) MUTING AND CANCELATION TECHNIQUES

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Wei Yang, San Diego, CA (US); Huilin Xu, Temecula, CA (US); Yuchul Kim, San Diego, CA (US); Linhai He, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 17/887,370

(22) Filed: Aug. 12, 2022

(65) Prior Publication Data

US 2024/0057193 A1 Feb. 15, 2024

(51) Int. Cl.
*H04W 76/20* (2018.01)
*H04W 72/20* (2023.01)

(52) U.S. Cl.
CPC .......... *H04W 76/20* (2018.02); *H04W 72/20* (2023.01)

(58) Field of Classification Search
CPC ..... H04W 76/20; H04W 72/20; H04W 76/15; H04W 92/18; H04W 72/40
See application file for complete search history.

(56) References Cited

U.S. PATENT DOCUMENTS

| | | | |
|---|---|---|---|
| 8,743,743 B1* | 6/2014 | Mai | H04M 3/566 |
| | | | 381/104 |
| 2003/0078080 A1* | 4/2003 | Miriyala | H04W 48/04 |
| | | | 455/528 |
| 2019/0394786 A1* | 12/2019 | Parron | H04W 4/46 |

* cited by examiner

*Primary Examiner* — Kiet Tang
(74) *Attorney, Agent, or Firm* — Holland & Hart LLP

(57) ABSTRACT

Methods, systems, and devices for wireless communication are described. A first user equipment (UE) may receive a control message that includes an indication to mute communications between the first UE and a second UE. The indication may be applicable to at least one communication link between the first UE and the second UE. The indication may include an identifier of the first UE, an identifier of the second UE, or an identifier of the at least one communication link. The first UE may receive the indication based on a power status of the first UE, a power status of the second UE, a reliability metric associated with the at least one communication link, or an interference metric associated with a network entity. Accordingly, the first UE may determine that the at least one communication link is muted for a time duration based on the indication.

27 Claims, 16 Drawing Sheets

MUTING AND CANCELATION TECHNIQUES

FIELD OF TECHNOLOGY

The following relates to wireless communication, including muting and cancelation techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a communication device may be unable to perform (e.g., transmit, receive) communications due to a battery level of the communication device. However, the communication device may be unable to notify other devices or prevent communications, which may result in signaling overhead and extraneous power consumption.

SUMMARY

The described techniques relate to improved methods, systems, devices, and apparatuses that support muting and cancelation techniques. For example, aspects of the present disclosure support techniques for canceling and/or muting communications associated with a specific communication link or device. In accordance with the techniques described herein, a first user equipment (UE) may receive a control message that includes an indication to mute communications between the first UE and a second UE. The indication may be applicable to at least one communication link between the first UE and the second UE. The indication may include an identifier of the first UE, an identifier of the second UE, an identifier of the at least one communication link, or any combination thereof. The first UE may receive the indication based on a power status of the first UE, a power status of the second UE, a reliability metric associated with the at least one communication link, or an interference metric associated with a network entity. Accordingly, the first UE may determine that the at least one communication link is muted for a time duration based on the indication.

A method for wireless communication at a first UE is described. The method may include receiving a control message that includes an indication to mute communications between the first UE and a second UE, where the indication to mute the communications between the first UE and the second UE is applicable to at least one communication link of one or more communication links between the first UE and the second UE. The method may further include determining that the at least one communication link of the one or more communication links between the first UE and the second UE is muted for a time duration based on the indication to mute the communications between the first UE and the second UE.

An apparatus for wireless communication at a first UE is described. The apparatus may include a processor, memory coupled with the processor, and instructions stored in the memory. The instructions may be executable by the processor to cause the apparatus to receive a control message that includes an indication to mute communications between the first UE and a second UE, where the indication to mute the communications between the first UE and the second UE is applicable to at least one communication link of one or more communication links between the first UE and the second UE. The instructions may be further executable by the processor to cause the apparatus to determine that the at least one communication link of the one or more communication links between the first UE and the second UE is muted for a time duration based on the indication to mute the communications between the first UE and the second UE.

Another apparatus for wireless communication at a first UE is described. The apparatus may include means for receiving a control message that includes an indication to mute communications between the first UE and a second UE, where the indication to mute the communications between the first UE and the second UE is applicable to at least one communication link of one or more communication links between the first UE and the second UE. The apparatus may further include means for determining that the at least one communication link of the one or more communication links between the first UE and the second UE is muted for a time duration based on the indication to mute the communications between the first UE and the second UE.

A non-transitory computer-readable medium storing code for wireless communication at a first UE is described. The code may include instructions executable by a processor to receive a control message that includes an indication to mute communications between the first UE and a second UE, where the indication to mute the communications between the first UE and the second UE is applicable to at least one communication link of one or more communication links between the first UE and the second UE. The instructions may be further executable to determine that the at least one communication link of the one or more communication links between the first UE and the second UE is muted for a time duration based on the indication to mute the communications between the first UE and the second UE.

A method for wireless communication at a wireless device is described. The method may include determining, based on monitoring one or more communication links, that a first UE and a second UE are communicating via the one or more communication links. The method may further include transmitting, based on determining that the first UE and the second UE are communicating via the one or more communication links, a control message that includes an indication to mute communications between the first UE and the second UE for a time duration, where the indication is applicable to at least one communication link of the one or more communication links.

An apparatus for wireless communication at a wireless device is described. The apparatus may include a processor, memory coupled with the processor, and instructions stored in the memory. The instructions may be executable by the processor to cause the apparatus to determine, based on monitoring one or more communication links, that a first UE and a second UE are communicating via the one or more communication links. The instructions may be further executable by the processor to cause the apparatus to transmit, based on determining that the first UE and the second UE are communicating via the one or more communication links, a control message that includes an indication to mute communications between the first UE and the second UE for a time duration, where the indication is applicable to at least one communication link of the one or more communication links.

Another apparatus for wireless communication at a wireless device is described. The apparatus may include means for determining, based on monitoring one or more communication links, that a first UE and a second UE are communicating via the one or more communication links. The apparatus may further include means for transmitting, based on determining that the first UE and the second UE are communicating via the one or more communication links, a control message that includes an indication to mute communications between the first UE and the second UE for a time duration, where the indication is applicable to at least one communication link of the one or more communication links.

A non-transitory computer-readable medium storing code for wireless communication at a wireless device is described. The code may include instructions executable by a processor to determine, based on monitoring one or more communication links, that a first UE and a second UE are communicating via the one or more communication links. The instructions may be further executable to transmit, based on determining that the first UE and the second UE are communicating via the one or more communication links, a control message that includes an indication to mute communications between the first UE and the second UE for a time duration, where the indication is applicable to at least one communication link of the one or more communication links.

DETAILED DESCRIPTION

Figure 1:
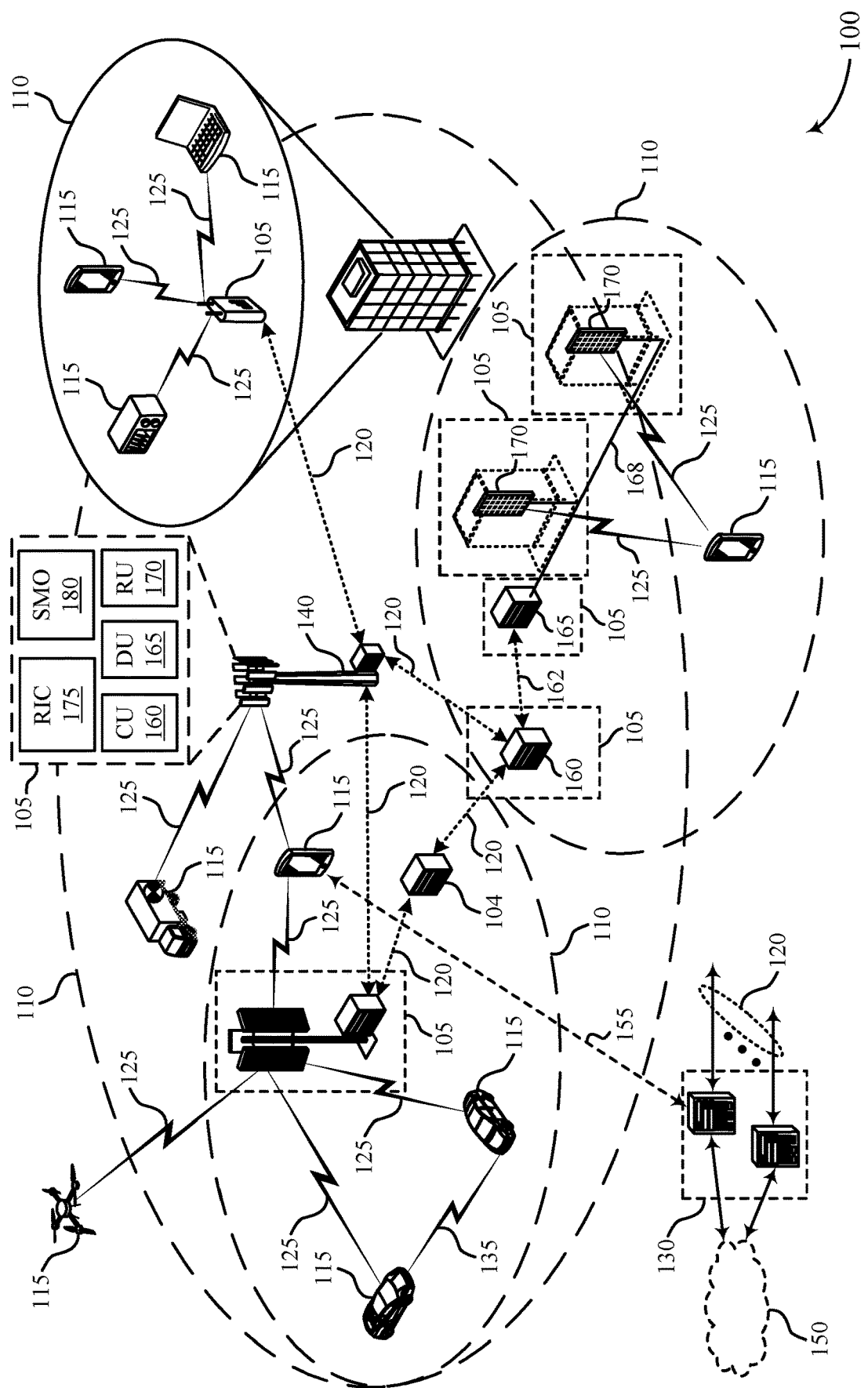
FIGS. 1 and 2 illustrate examples of wireless communications systems that support muting and cancelation techniques in accordance with one or more aspects of the present disclosure.

Some communication devices, such as Radio Frequency Identification (RFID) tags, passive Internet of Things (IoT) devices (which may be referred to as zero-power IoT devices), and energy harvesting (EH) user equipments (UEs), may have a relatively limited power supply. In some cases, these low-power communication devices (equivalently referred to as wireless devices or UEs) may have insufficient battery to perform one or more upcoming (or ongoing) communications with other communication devices (UEs, network entities) in a wireless communications system. However, the low-power communication devices may be unable to notify or otherwise convey this information to the other communication devices. In such cases, the low-power communication devices may either perform the upcoming (or ongoing) communications with the other communication devices or refrain from communicating with the other communication devices.

Performing the communications as scheduled may further drain the battery of the low-power communication devices, whereas dropping (e.g., refraining from performing) the communications may result in relatively higher communication resource overhead, inefficiency, latency, and power consumption at the other communication devices. For example, if a low-power communication device is scheduled to transmit a sidelink message to a UE, the resources allocated (or selected) for transmission of the sidelink message may be unused because the low-power communication device is unable to transmit the sidelink message as scheduled. Moreover, the UE may waste power monitoring for the sidelink message because the UE is unable to determine that the low-power communication device is running low on battery.

Aspects of the present disclosure provide for muting or canceling communications associated with a specific communication device or communication link (as opposed to individual transmissions). For example, a controlling device such as a primary UE, a network entity, or a programmable logic controller (PLC) may mute communications between a first communication device and a second communication device by transmitting a control message that includes a muting indication associated with the first communication device or a communication link between the first communication device and the second communication device. Upon receiving the indication, the second communication device may refrain from communicating with the first communication device for a time duration.

In some examples, the control message may include an identifier of the first communication device or an identifier of the communication link between the first communication device and the second communication device, or both. The controlling device may, in some examples, transmit the muting indication to the second communication device in response to a request from the first communication device. For example, if a power level of the first communication device drops below a threshold power level, the first communication device may transmit a muting request to the controlling device such that the controlling device mutes communications between the first communication device and the second communication device. The controlling device may also transmit the muting indication based on a reliability metric associated with the communication link or an interference metric associated with the controlling device, or both.

Aspects of the present disclosure may be implemented to realize one or more of the following advantages. The described techniques may result in relatively lower communication resource overhead, relatively lower power consumption, and relatively greater communication reliability, among other benefits. For example, a network entity may increase the likelihood of a first UE successfully communicating with a second UE via a communication link by transmitting a muting indication to other devices using the communication link. Upon receiving the muting indication from the network entity, the other devices may refrain from accessing the communication link for a time duration, which may enable the first UE and the second UE to communicate with relatively lower interference and relatively greater reliability.

Aspects of the disclosure are initially described in the context of wireless communications systems, communication timelines, and process flows. Aspects of the disclosure are further illustrated by and described with reference to apparatus diagrams, system diagrams, and flowcharts that relate to muting and cancelation techniques.

FIG. 1 illustrates an example of a wireless communications system 100 that supports muting and cancelation techniques in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120).

IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support muting and cancelation techniques as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some wireless communication systems, such as 5G NR systems, may support wireless devices establishing an access link (e.g., a Uu interface) or a sidelink (e.g., a PC5 interface), or both. For example, a UE 115 may establish an access link with a network entity 105 and a sidelink (e.g., a sidelink communication link) with another UE 115. In some cases, a UE 115 may establish an access link with a network entity 105 and a sidelink with another UE 115 that serves as a relay such that the UE 115 may communicate with the network entity 105 via the access link or the sidelink. Sidelink communications may also be referred to as vehicle-to-vehicle (V2V) communications, vehicle-to-everything (V2X) communications, or device-to-device (D2D) communications, among other examples.

In the wireless communications system 100, a first UE 115 may receive a control message that includes an indication to mute communications between the first UE 115 and a second UE 115. The indication may be applicable to at least one communication link 125 between the first UE 115 and the second UE 115. The indication may include an identifier of the first UE 115, an identifier of the second UE 115, an identifier of the at least one communication link 125, or any combination thereof. The first UE 115 may receive the indication based on a power status of the first UE 115, a power status of the second UE 115, a reliability metric associated with the at least one communication link 125, an interference metric associated with a network entity 105, or any combination thereof. Accordingly, the first UE 115 may determine that the at least one communication link 125 between the first UE 115 and the second UE 115 is muted for a time duration based on the indication.

Aspects of the wireless communications system 100 may be implemented to realize one or more of the following advantages. The techniques described with reference to FIG. 1 may result in relatively lower communication resource overhead, relatively lower power consumption, and relatively greater communication reliability, among other benefits. For example, if a network entity 105 receives an indication that a battery level of a UE 115 (e.g., a low-power communication device) is below a threshold, the network entity 105 may mute all communications to and from the UE 115 for a time duration by transmitting a muting indication to other UEs 115 and network entities 105 in the wireless communications system 100. Additionally, or alternatively, some communications to and from the UE 115 may be canceled based on the indication from the network entity 105. As a result, the UE 115 may cease communications and enter a sleep mode to conserve power (or recharge).

Figure 2:
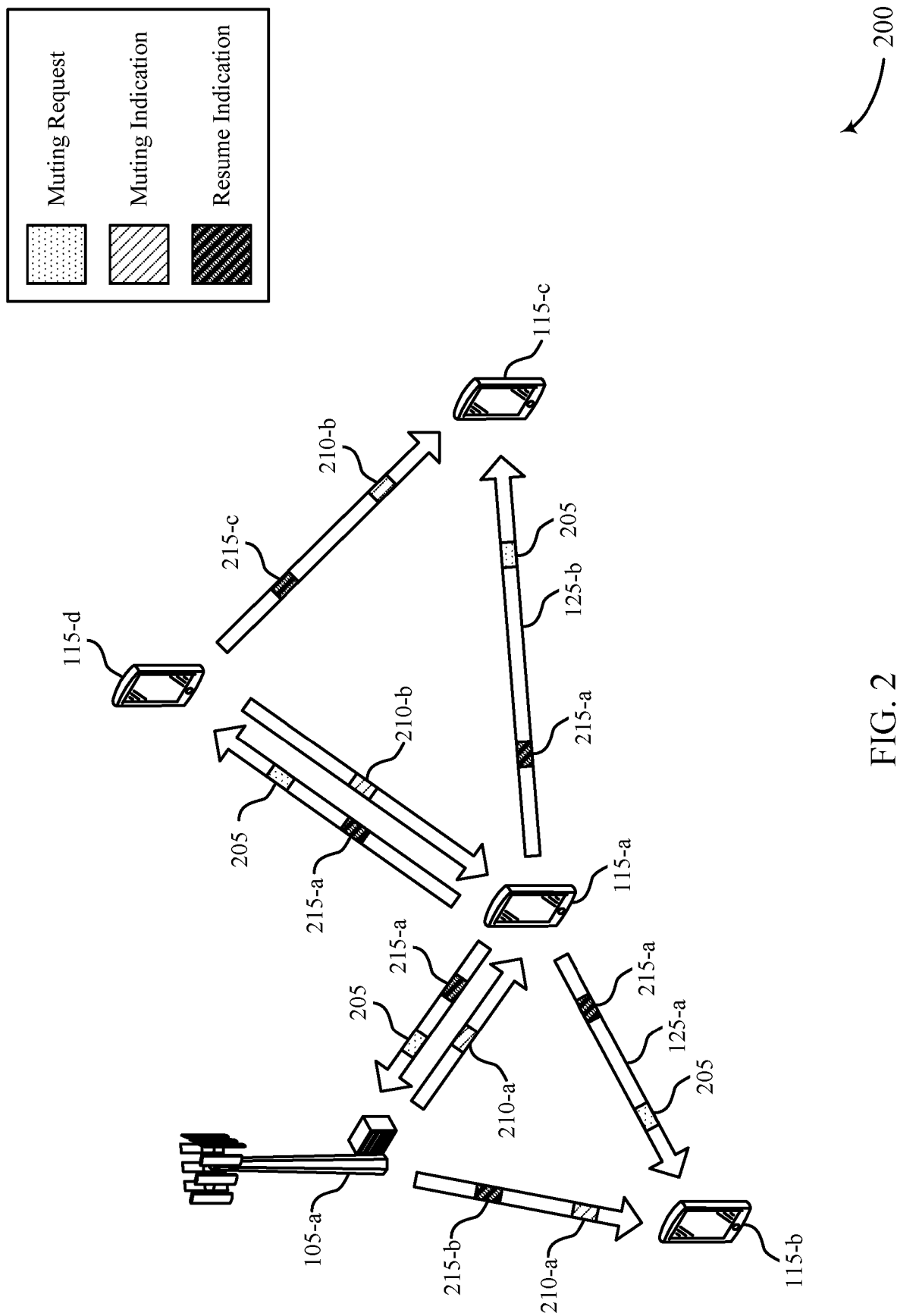

FIG. 2 illustrates an example of a wireless communications system 200 that supports muting and cancelation techniques in accordance with one or more aspects of the present disclosure. The wireless communications system 200 may implement or be implemented by aspects of wireless communications system 100. For example, the wireless communications system 200 may include a network entity 105-a, a UE 115-a, a UE 115-b, a UE 115-c, and a UE 115-d, which may be examples of corresponding devices described with reference to FIG. 1. The devices of the wireless communications system 200 may communicate via communication links 125, which may be examples of downlinks, uplinks, sidelinks, or other communication links not specifically mentioned herein. In the example of FIG. 2, one or both of the network entity 105-a (e.g., a gNB or controlling unit) or the UE 115-d (e.g., a primary or controlling UE) may mute communications between the UE 115-a (e.g., low-power communication device) and other devices in the wireless communications system 200.

As described herein, low-power communication devices may refer to wireless devices with relatively limited power (e.g., relatively small storage units, such as a battery) that intermittently communicate with other communication devices. For example, the UE 115-a (an EH-UE) may transmit or receive a signal and then wait (e.g., refrain from performing other communications) until the UE 115-a has sufficient energy to continue communications. Examples of low-power communication devices include RFID tags and passive IoT devices. In some cases, the network entity 105-a may configure one or more of the UEs 115 to refrain from sending data or otherwise communicating with a low-power communication device on a sidelink or any other communication link monitored by the network entity 105-a (e.g., a communication link used by the low-power communication device) to reduce the likelihood of draining the battery or storage unit of the low-power communication device. Such techniques may also be applicable to modems with low-power wake-up receivers (LP-WUR) that selectively send wake-up indications to a main radio.

The techniques described herein relate to muting sidelink (and other) resources related used for communicating (sending data to or receiving data from) to a communication device with a limited energy (power) source. Aspects of the present disclosure may also enable a low-power communication device (e.g., the UE 115-*a*) to coordinate with other UEs 115 regarding cancelation and/or scheduling of transmissions on various communication links. The muting and cancelation indications described herein may be transmitted from the network entity 105-*a* (e.g., a gNB) or the UE 115-*d* (e.g., a PLC or a primary UE) and may be used to mute and/or cancel transmissions of any type (sidelink, downlink, uplink). The described techniques may reduce extraneous power consumption at a receiving device if the battery level of the receiving device is running low (below a threshold).

For example, if the network entity 105-*a* or the UE 115-*d* receive an indication that a battery level of the UE 115-*a* is below a threshold, the UE 115-*d* or the network entity 105-*a* may relay this information to the UE 115-*b* (or mute communications between the UE 115-*a* and the UE 115-*b*) such that the UE 115-*a* does not waste power by transmitting signals to the UE 115-*b*, receiving signals from the UE 115-*b*, or both. Muting communications between the UE 115-*a* and the UE 115-*b* may reduce power consumption at the UE 115-*a* (e.g., the receiving device) because the UE 115-*a* may enter sleep mode (e.g., deactivate one or more RF circuits) instead of monitoring for transmissions from the UE 115-*b*. Further, the techniques described with reference to FIG. 2 may enable the devices of the wireless communications system 200 to use communication links 125 with relatively greater reliability. For example, if the UE 115-*a* has a relatively small energy supply (which may affect the maximum power or duration of transmissions from the UE 115-*a*), the network entity 105-*a* may mute a communication link 125-*a* such that the UE 115-*a* may access the communication link 125-*a* with relatively greater reliability (e.g., because other UEs may refrain from transmitting on the communication link 125-*a*).

In the example of FIG. 2, the UE 115-*a* may transmit a muting request 205 to one or more of the UE 115-*b*, the UE 115-*c*, the UE 115-*d*, or the network entity 105-*a* in response to determining that a power status (battery level) of the UE 115-*a* is below a threshold. In some examples, the muting request 205 may include an indication of the power status of the UE 115-*a* or an indication to mute transmissions to and from the UE 115-*a* for a time duration, or both. After receiving the muting request 205 from the UE 115-*a*, the UE 115-*d* (a primary or controlling UE) may transmit a muting indication 210-*b* to the UE 115-*c*. The muting indication 210-*b* may cancel or mute communications between the UE 115-*c* and the UE 115-*a* for a time duration. Likewise, the network entity 105-*a* may cancel or mute all communications between the UE 115-*b* and the UE 115-*a* by transmitting a muting indication 210-*a* to the UE 115-*b*.

In some examples, the UE 115-*d* may transmit the muting indication 210-*b* to the UE 115-*c* based on a reliability metric of a communication link 125-*b* between the UE 115-*c* and the UE 115-*a*. For example, if the UE 115-*d* detects that a channel quality indicator (CQI) associated with the communication link 125-*b* is below a threshold, the UE 115-*d* may transmit the muting indication 210-*b* to the UE 115-*c* such that the UE 115-*a* accesses the communication link 125-*a* with relatively greater reliability. Similarly, the network entity 105-*a* may transmit the muting indication 210-*a* to the UE 115-*b* based on an interference metric associated with the network entity 105-*a*. For example, if the network entity 105-*a* determines that a signal to interference and noise ratio (SINR) of an incoming signal is below a threshold, the network entity 105-*a* may transmit the muting indication 210-*a* to the UE 115-*b* to improve the likelihood of the network entity 105-*a* successfully receiving and decoding the incoming signal.

In some examples, the UE 115-*a* may transmit a resume indication 215-*a* to one or more of the UE 115-*b*, the UE 115-*c*, the UE 115-*d*, or the network entity 105-*a* in response to determining that the power status of the UE 115-*a* is above the threshold. The resume indication 215-*a* from the UE 115-*a* may overwrite previous muting indications 210 from the UE 115-*d* and the network entity 105-*a*. Thus, the UE 115-*b* and the UE 115-*c* may re-establish communications with the UE 115-*a* after receiving the resume indication 215-*a*. In other examples, the UE 115-*b* and the UE 115-*c* may resume communications with the UE 115-*a* after a time duration (for which the muting indications 210 are valid) has elapsed. Additionally, or alternatively, one or both of the UE 115-*b* or the UE 115-*c* may initiate a timer after receiving the muting indications 210, and may resume communications with the UE 115-*a* upon expiry of the timer. In some examples, the UE 115-*d* or the network entity 105-*a* may transmit resume indications 215 to other devices in response to a notification from the UE 115-*a*. For example, the network entity 105-*a* may transmit a resume indication 215-*b* to the UE 115-*b* (to resume communications between the UE 115-*a* and the UE 115-*b*), and the UE 115-*d* may transmit a resume indication 215-*c* to the UE 115-*c* (to resume communications between the UE 115-*a* and the UE 115-*c*).

Figure 3:
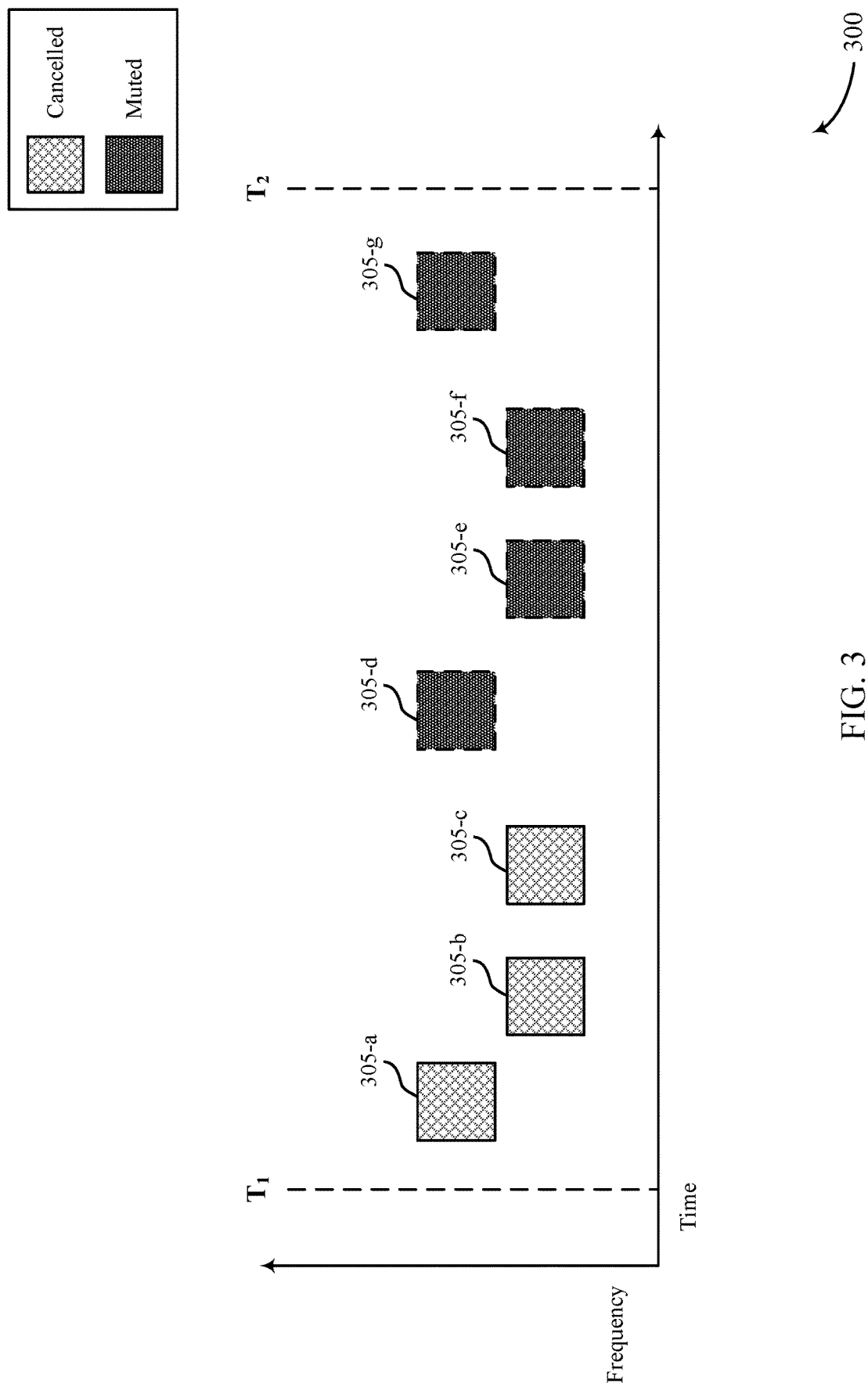
FIG. 3 illustrates an example of a communication timeline that supports muting and cancelation techniques in accordance with one or more aspects of the present disclosure.

FIG. 3 illustrates an example of a communication timeline 300 that supports muting and cancelation techniques in accordance with one or more aspects of the present disclosure. The communication timeline 300 may implement or be implemented by aspects of the wireless communications system 100 or the wireless communications system 200. For example, the communication timeline 300 may be implemented by a UE or a network entity, which may be examples of corresponding devices described with reference to FIGS. 1 and 2. In the example of FIG. 3, a UE may cancel or mute communications 305 after receiving a muting indication from a controlling device (e.g., a network entity, PLC, or primary UE) at a first time ($T_1$). As described herein, the muting indication from the controlling device may include a device identifier (of a communication device to be muted), a link identifier (of a communication link to be muted), or both.

To avoid draining the battery of a low-power communication device (e.g., the UE 115-*a* described with reference to FIG. 2), the controlling device may use L1, L2, or L3 signaling to mute communications on any communication link that is monitored by the controlling device. This signaling may cancel or mute transmissions to or from a UE (or a group of UEs) until the UE resumes communications by sending a clear-up indication (which overrides a previous muting or cancelation indication). In some examples, a muting indication from the controlling device may be valid until a subsequent resume indication overwrites the muting indication. In other examples, a muting indication may be valid for a specific duration of time that is dictated by a timer. The duration of this timer may be selected or determined by the controlling device based on various factors such as a request from the low-power communication device (e.g., an EH-UE), a battery charging rate reported by the low-power communication device, an energy capacity of the low-power communication device, a battery discharge rate of the low-power communication device, a power consumption rate of the low-power communication device, or some combination thereof.

In some examples, a muting indication (e.g., a muting indication 210 described with reference to FIG. 2) from the controlling device may be valid for a quantity of symbols, slots, or frames. This quantity may be defined or otherwise configured via RRC signaling. In some examples, the controlling device or the low-power communication device may transmit a resume indication (e.g., a resume indication 215 described with reference to FIG. 2) to restart communications with other UEs. Thus, the low-power communication device may resume communications with other UEs (e.g., the UE 115-b and the UE 115-c described with reference to FIG. 2) upon expiry of a timer or after receiving a resume indication from one or both of the controlling device or the low-power communication device.

In some examples, a universal cancelation indication may be used to mute all transmissions to or from a communication device. This indication may be sent via a Uu link (from a gNB or network entity) using L1, L2, or L3 signaling such as downlink control information (DCI), RRC signaling, or a MAC control element (CE). The indication may cancel or mute transmissions (on any communication link) from one or more UEs to the low-power communication device. Additionally, or alternatively, the indication may be sent via a sidelink (from a PLC or primary UE) using L1, L2, or L3 signaling. One or more PHY channels, dedicated resources, frequency bands, or resource pools may be used for transmission of such indications. To support the universal muting techniques described herein, UEs may be associated with a universal identifier that is applicable to one or more RATs or communication links. If, for example, a communication device receives a muting indication (from the controlling device) that includes a universal UE identifier, the communication device may use the universal UE identifier to determine which UE is muted.

Some sidelink communication schemes may not support cancelation. The techniques described herein support mechanisms for communicating (transmitting and receiving) sidelink cancelation indications and associating such indications with other Uu link cancelation indications. A sidelink cancelation indication may come from a network entity (to a transmitting UE), and may cancel one or more sidelink transmissions or slots indicated by one or more grants. Additionally, or alternatively, a sidelink cancelation indication may be transmitted by a PLC, a primary UE, or a transmitting UE via a sidelink channel (using L1, L2, or L3 signaling). A sidelink cancelation indication may be associated with a cancelation of uplink transmissions. For example, an uplink cancelation indication (transmitted by means of DCI) may also cancel sidelink transmissions in all slots specified by the uplink cancelation indication. In some examples, a communication device may determine whether an uplink cancelation indication is applicable to sidelink communications based on an operating mode of the communication device.

A sidelink cancelation indication may also be associated with downlink cancelation indications. For example, a cancelation indication (uplink or downlink) may cancel all communications at a UE for a time duration. In some examples, the UE (a low-power communication device) may receive a cancelation indication (sidelink, uplink, or downlink) and deactivate one or more radio frequency front end (RFFE) circuits to conserve power. This behavior (e.g., how to interpret cancelation indications) may be configured or signaled to a UE. The sidelink cancelation mechanisms described herein may reduce interference at a network entity (from other UEs) and increase the reliability of transmissions from a low-power communication device. For example, transmitting a sidelink cancelation indication to other UEs may enable a low-power communication device to access uplink resources with relatively lower interference and relatively greater reliability.

As described herein, the battery level of a low-power communication device (also referred to herein as a wireless device or a UE) may occasionally drop below a threshold. To assist other devices, the low-power communication device may send an announcement to other communication devices (UEs, network entities). For example, a low-power communication device may request that other communication devices (network devices, UEs, gNBs) cancel or mute transmissions to the low-power communication device for a time duration specified by L1, L2, or L3 signaling. The low-power communication device may also transmit a request to mute transmissions from the low-power communication device to one or more receiving devices for a time duration specified by L1, L2, or L3 signaling. Wireless communications systems with low-power communication devices (e.g., UEs with limited energy storage) may have channels or resources that are dedicated for transmission of muting or cancelation indications from low-power communication devices.

As described herein, muting may refer to blocking (preventing, suppressing) communications (e.g., subsequent communications) from being scheduled (without applying cancelation). Thus, if the UE receives the muting indication (from a controlling device) after scheduling the communication 305-a, the communication 305-b, and the communication 305-c but prior to scheduling a communication 305-d, a communication 305-e, a communication 305-f, and a communication 305-g, the UE may perform the previously scheduled communications and mute (refrain from scheduling) the communication 305-d, the communication 305-e, the communication 305-f, and the communication 305-g after receiving the muting indication. If, for example, the UE receives a subsequent resume indication or a timer associated with the muting indication expires at a second time ($T_2$), the UE may resume scheduling (or performing) communications. In some examples, muting may refer to canceling scheduled (or ongoing) communications associated with a communication device. For example, if a UE receives a muting indication at a first time ($T_1$) after scheduling (or determining to perform) a communication 305-a, a communication 305-b, and a communication 305-c, the UE may cancel the communication 305-a, the communication 305-b, and the communication 305-c in response to the muting indication.

Figure 4:
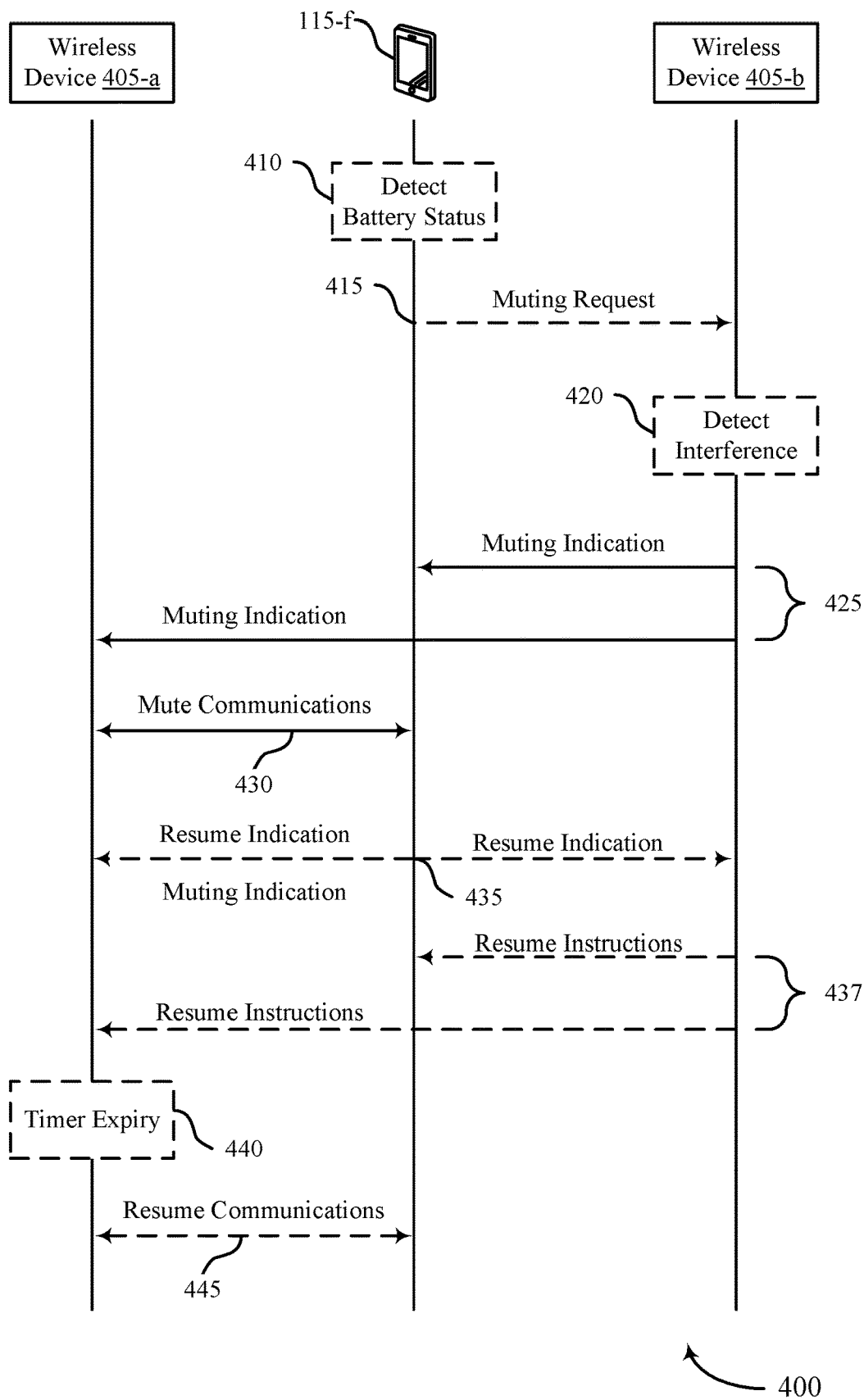
FIG. 4 illustrates an example of a process flow in a system that supports muting and cancelation techniques in accordance with one or more aspects of the present disclosure.

FIG. 4 illustrates an example of a process flow 400 in a system that supports muting and cancelation techniques in accordance with one or more aspects of the present disclosure. In some examples, the process flow 400 may implement aspects of the wireless communications system 100 or the wireless communications system 200. The process flow 400 may illustrate communications between a wireless device 405-a, a wireless device 405-b, and a UE 115-f, which may be examples of various wireless devices described herein. For example, the wireless devices 405 may be examples of a UE 115, a network entity 105, a PLC, or any other communication device described herein. In the following description of the process flow 400, operations between the UE 115-f and the wireless devices 405 may be added, omitted, or performed in a different order (with respect to the exemplary order shown).

At 410, the UE 115-f (e.g., a low-power communication device) may detect a power status of the UE 115-f In some examples, the power status may be associated with a battery unit or storage unit of the UE 115-*f* In some examples, the power status may include a charging rate of the UE 115-*f*, an energy capacity of the UE 115-*f*, a discharging rate of the UE 115-*f*, a power level of the UE 115-*f*, or any combination thereof. At 415, the UE 115-*f* may transmit a muting request to the wireless device 405-*b*. The muting request (transmitted by means of L1, L2, or L3 signaling) may include an indication to mute all transmissions to and from the UE 115-*f* for a time duration. The muting request may also indicate the power status of the UE 115-*f*. At 420, the wireless device 405-*b* (e.g., a controlling device) may detect or measure an interference level associated with the wireless device 405-*b*. The wireless device 405-*b* may also determine a reliability metric associated with one or more communication links between the UE 115-*f* and the wireless device 405-*a*.

At 425, the wireless device 405-*b* may transmit a muting indication to the UE 115-*f* and the wireless device 405-*a*. The muting indication may mute or cancel communications between the UE 115-*f* and the wireless device 405-*a* for a time duration. The muting indication may apply to one or more communication links between the wireless device 405-*a* and the UE 115-*f* In some aspects, the muting indication may mute communications via a communication link that may be monitored by the wireless device 405-*b*. In some examples, the wireless device 405-*b* may transmit the muting indication based on the reliability metric of the one or more communication links, a transmit power of the wireless device 405-*a*, or both. In some examples, the muting indication may include one or more communication link identifiers associated with the one or more communication links. Here, the link identifier may mute or cancel communications on one, multiple, or all communication links associated with one or more communication devices.

The muting indication may include a device identifier associated with the wireless device 405-*a*, a device identifier associated with the UE 1154, a link identifier associated with a communication link between the UE 115-*f* and the wireless device 405-*a*, or any combination thereof. In some examples, the muting indication may specify the time duration for which to mute communications between the UE 115-*f* and the wireless device 405-*a*. In other examples, the wireless device 405-*b* may transmit a second control message indicating the time duration. Additionally, or alternatively, the UE 115-*f* may initiate a timer responsive to the muting indication, and may mute communications or cancel communications, or both until the timer has expired. The time duration may include a quantity of symbols, slots, frames, or any combination thereof. The wireless device 405-*b* may transmit the muting indication using various communication links (sidelink, uplink, downlink), resources, and signaling mechanisms (L1, L2, L3).

At 430, the UE 115-*f* may cancel or mute communications with the wireless device 405-*a* for a time duration. For example, the UE 115-*f* may cancel one or more transmissions to the wireless device 405-*a* or transmissions from the wireless device 405-*a*. In other examples, the UE 115-*f* may refrain from scheduling additional communications with the wireless device 405-*a*. In some examples, the muting indication may be or include a universal cancelation indication that cancels and/or mutes communications between the UE 115-*f* and the wireless device 405-*a* (e.g., while the universal cancelation indication is valid). In some examples, the UE 115-*f* may mute one or more communications with the wireless device 405-*a* based on an association between the UE 115-*f* and a device identifier signaled in a control message (the muting indication).

For example, the UE 115-*f* may determine that the muting indication is applicable to the UE 115-*f* based on an association between the device identifier and one or more of an L1 identifier of the UE 115-*f*, a permanent identifier of the UE 115-*f*, a universal identifier of the UE 115-*f*, a network-configured identifier of the UE 115-*f*, or any combination thereof. In some aspects, the device identifier may be used when various devices communicate, and the device identifier may be defined across one or more communication links monitored, for example, by a network entity or controlling UE. In other examples, the UE 115-*f* may determine that the muting indication is applicable to the wireless device 405-*a* based on an association between an identifier of the wireless device 405-*a* and the device identifier specified by the muting indication. In some examples, the UE 115-*f* may mute communications between the UE 115-*f* and the wireless device 405-*a* based on a mapping between a link identifier specified by the muting indication and a link identifier of a communication link between the UE 115-*f* and the wireless device 405-*a*. In some examples, the UE 115-*f* may deactivate one or more RFFE circuits after muting communications between the UE 115-*f* and the wireless device 405-*a*.

At 435, the UE 115-*f* may transmit a resume indication to the wireless device 405-*a*. Additionally, or alternatively, the UE 115-*f* may transmit the resume indication to the wireless device 405-*b*. The resume indication (transmitted by means of L1, L2, or L3 signaling) may include an indication to resume communications between the UE 115-*f* and the wireless device 405-*a*. In some examples, the resume indication may include a request to resume communications via one or more communication links between the UE 115-*f* and the wireless device 405-*a*. In some examples, the wireless device 405-*a* may receive the resume indication from the wireless device 405-*b* (e.g., a controlling device). In some aspects, at 437, the wireless device 405-*b* may optionally transmit a message including instructions (e.g., resume instructions) to one or both of the UE 115-*f* or the wireless device 405-*a*, for example, in response to the resume indication received from the UE 115-*f*, based on an expiration of a timer, or both. Here, the instructions may include an indication to resume communications via the one or more links that were previously muted. In some aspects, the instructions may include a device identifier associated with the wireless device 405-*a*, a device identifier associated with the UE 115-*f*, a link identifier associated with a communication link between the UE 115-*f* and the wireless device 405-*a*, or any combination thereof. In some other examples, the wireless device 405-*a* may determine that a timer associated with the muting indication has expired at 440. At 445, the wireless device 405-*a* may resume communications with the UE 115-*f* (via the one or more communication links) in response to the resume indication or the timer expiry.

Figure 5:
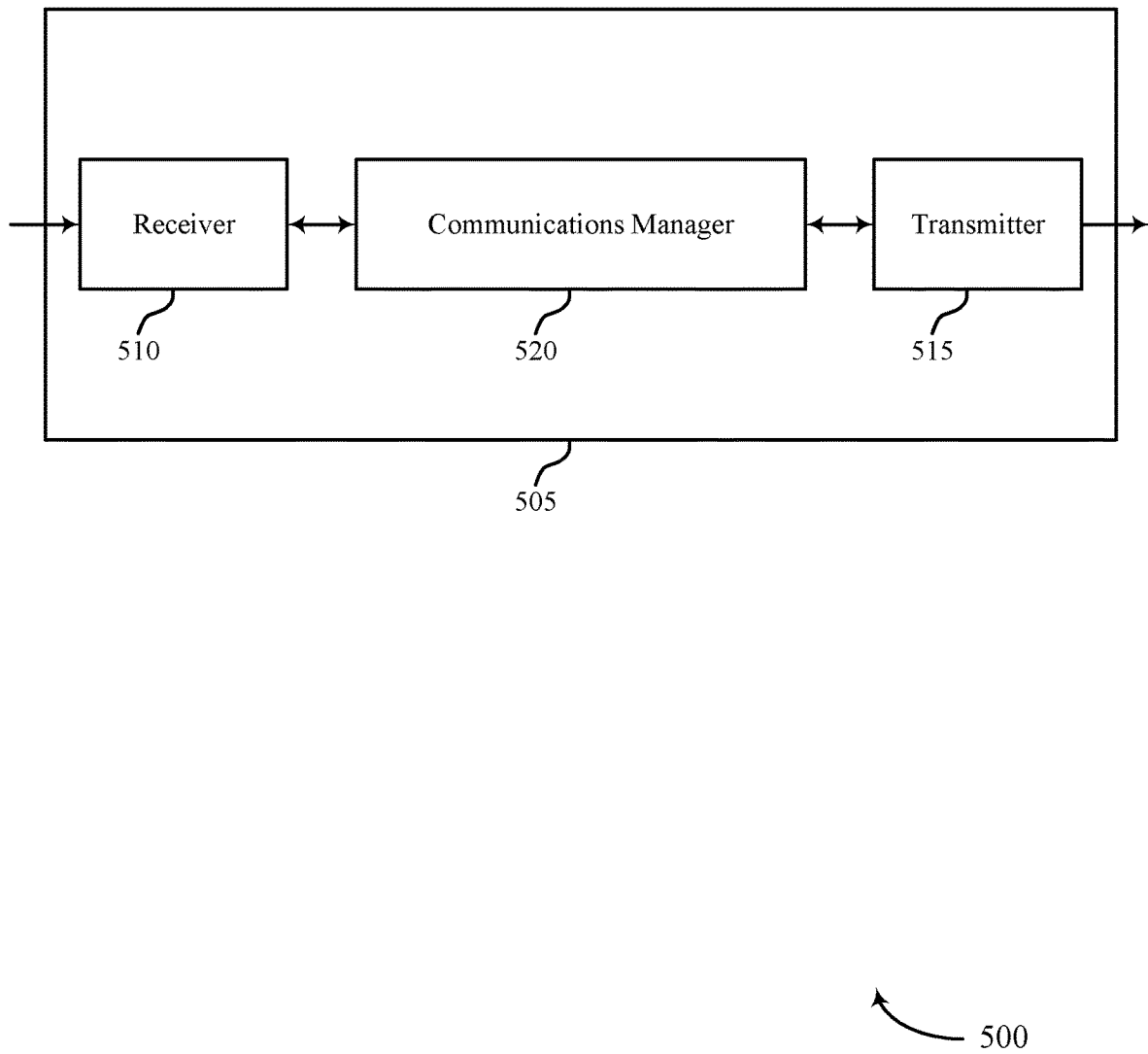
FIGS. 5 and 6 show block diagrams of devices that support muting and cancelation techniques in accordance with one or more aspects of the present disclosure.

FIG. 5 shows a block diagram 500 of a device 505 that supports muting and cancelation techniques in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to muting and cancelation techniques). Information may be passed on to other components of the device 505. The receiver 510 may utilize a single antenna or multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to muting and cancelation techniques). In some examples, the transmitter 515 may be co-located with a receiver 510 in a transceiver. The transmitter 515 may utilize a single antenna or multiple antennas.

The communications manager 520, the receiver 510, the transmitter 515, or various combinations thereof or various components thereof may be examples of means for performing various aspects of muting and cancelation techniques as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE (the device 505) in accordance with examples disclosed herein. For example, the communications manager 520 may be configured as or otherwise support a means for receiving a control message that includes an indication to mute communications between the first UE and a second UE, where the indication to mute the communications between the first UE and the second UE is applicable to at least one communication link of one or more communication links between the first UE and the second UE. The communications manager 520 may be configured as or otherwise support a means for determining that the at least one communication link of the one or more communication links between the first UE and the second UE is muted for a time duration based on the indication to mute the communications between the first UE and the second UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for relatively lower power consumption. For example, the techniques described herein may enable the device 505 to deactivate one or more RF circuits and enter sleep mode after receiving a muting indication from a controlling device (e.g., a network entity, primary UE, or PLC).

Figure 6:
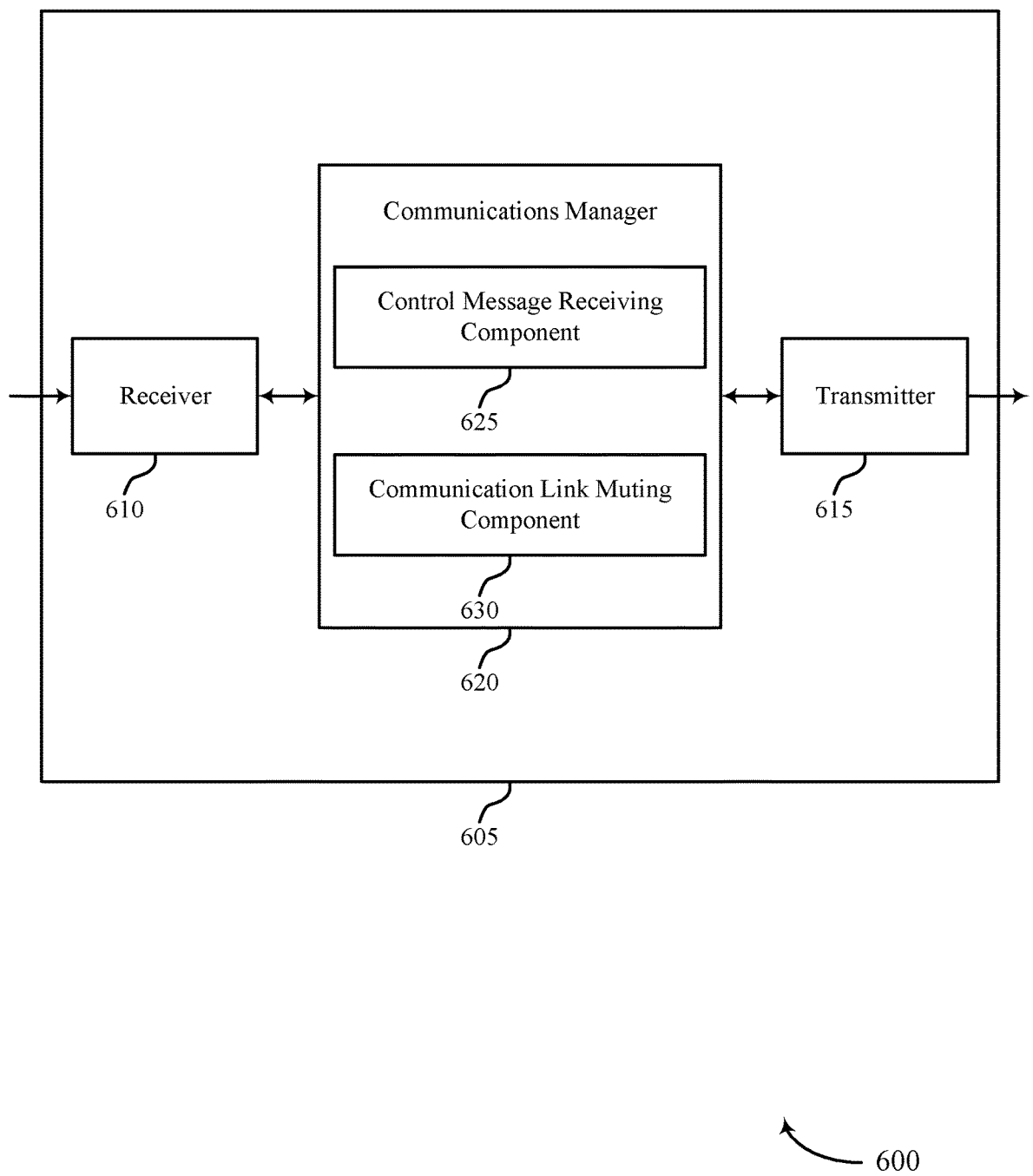

FIG. 6 shows a block diagram 600 of a device 605 that supports muting and cancelation techniques in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to muting and cancelation techniques). Information may be passed on to other components of the device 605. The receiver 610 may utilize a single antenna or multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to muting and cancelation techniques). In some examples, the transmitter 615 may be co-located with a receiver 610 in a transceiver. The transmitter 615 may utilize a single antenna or multiple antennas.

The device 605, or various components thereof, may be an example of means for performing various aspects of muting and cancelation techniques as described herein. For example, the communications manager 620 may include a control message receiving component 625 a communication link muting component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE (the device 605) in accordance with examples disclosed herein. The control message receiving component 625 may be configured as or otherwise support a means for receiving a control message that includes an indication to mute communications between the first UE and a second UE, where the indication to mute the communications between the first UE and the second UE is applicable to at least one communication link of one or more communication links between the first UE and the second UE. The communication link muting component 630 may be configured as or otherwise support a means for determining that the at least one communication link of the one or more communication links between the first UE and the second UE is muted for a time duration based on the indication to mute the communications between the first UE and the second UE.

Figure 7:
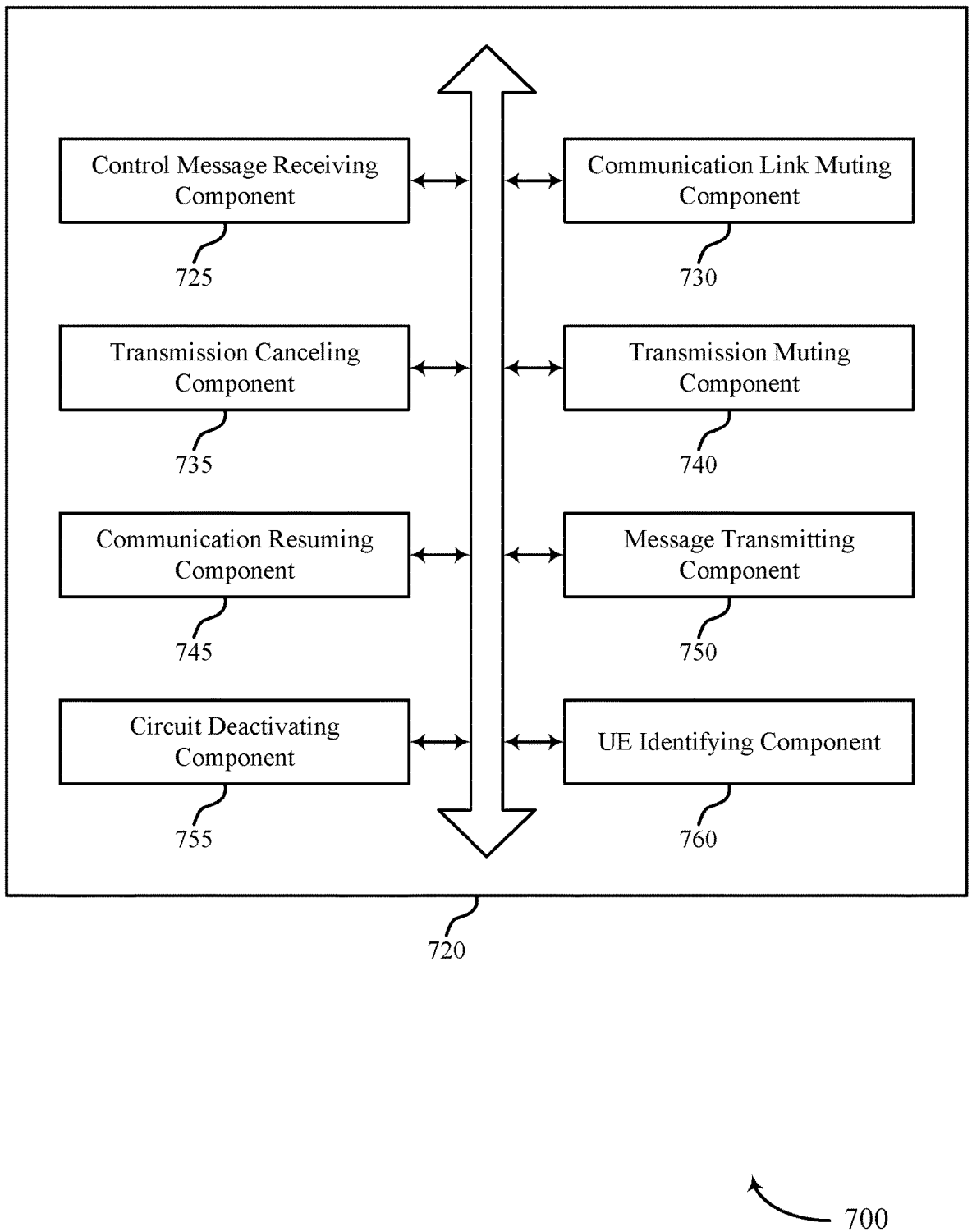
FIG. 7 shows a block diagram of a communications manager that supports muting and cancelation techniques in accordance with one or more aspects of the present disclosure.

FIG. 7 shows a block diagram 700 of a communications manager 720 that supports muting and cancelation techniques in accordance with one or more aspects of the present disclosure. The communications manager 720 may be an example of aspects of a communications manager 520, a communications manager 620, or both, as described herein. The communications manager 720, or various components thereof, may be an example of means for performing various aspects of muting and cancelation techniques as described herein. For example, the communications manager 720 may include a control message receiving component 725, a communication link muting component 730, a transmission canceling component 735, a transmission muting component 740, a communication resuming component 745, a message transmitting component 750, a circuit deactivating component 755, a UE identifying component 760, or any combination thereof. Each of these components may communicate, directly or indirectly, with one another (e.g., via one or more buses).

The communications manager 720 may support wireless communication at a first UE in accordance with examples disclosed herein. The control message receiving component 725 may be configured as or otherwise support a means for receiving a control message that includes an indication to mute communications between the first UE and a second UE, where the indication to mute the communications between the first UE and the second UE is applicable to at least one communication link of one or more communication links between the first UE and the second UE. The communication link muting component 730 may be configured as or otherwise support a means for determining that the at least one communication link of the one or more communication links between the first UE and the second UE is muted for a time duration based on the indication to mute the communications between the first UE and the second UE.

In some examples, to support determining that the at least one communication link is muted, the communication link muting component 730 may be configured as or otherwise support a means for determining that a transmission of at least one message from the first UE to the second UE is muted based on the indication. In some examples, to support determining that the at least one communication link is muted, the transmission canceling component 735 may be configured as or otherwise support a means for canceling the transmission of the at least one message in response to receiving the control message.

In some examples, to support determining that the at least one communication link is muted, the communication link muting component 730 may be configured as or otherwise support a means for determining that a transmission of at least one message from the first UE to the second UE is muted based on the indication. In some examples, to support determining that the at least one communication link is muted, the transmission muting component 740 may be configured as or otherwise support a means for refraining from transmitting the at least one message after one or more scheduled messages are transmitted by the first UE.

In some examples, to support determining that the at least one communication link is muted, the transmission muting component 740 may be configured as or otherwise support a means for determining that a transmission of at least one message from the second UE to the first UE is muted for the time duration based on the indication.

In some examples, the control message further indicates a first communication link identifier associated with a first communication link of the one or more communication links. In some examples, to support determining that the at least one communication link is muted, the transmission muting component 740 may be configured as or otherwise support a means for determining that a transmission of at least one message via the first communication link is muted based on the first communication link identifier and the indication to mute the communications.

In some examples, the control message further indicates multiple communication link identifiers associated with multiple communication links. In some examples, to support determining that the at least one communication link is muted, the transmission muting component 740 may be configured as or otherwise support a means for determining that transmission of two or more messages via the multiple communication links is muted based on the multiple communication link identifiers and the indication to mute the communications.

In some examples, the control message further indicates a device identifier. In some examples, to support determining that the at least one communication link is muted, the transmission muting component 740 may be configured as or otherwise support a means for determining that a transmission of at least one message to the second UE or reception of at least one message from the second UE is muted based on an association between the device identifier and the at least one message.

In some examples, to support determining that the at least one communication link is muted, the transmission muting component 740 may be configured as or otherwise support a means for refraining from communicating the at least one message based on the device identifier and the indication to mute the communications.

In some examples, the UE identifying component 760 may be configured as or otherwise support a means for determining that the indication is applicable to the first UE based on an association between the device identifier and one or more of an L1 identifier of the first UE, an L2 identifier of the first UE, a permanent identifier of the first UE, a universal identifier of the first UE, or a network-configured identifier of the first UE, or any combination thereof.

In some examples, to support determining that the at least one communication link is muted, the transmission muting component 740 may be configured as or otherwise support a means for determining that transmission of at least one message via a first communication link is muted based on the indication to mute the communications, a mapping between the device identifier and a first communication link identifier indicated by the control message, an association between the first communication link identifier and the first communication link, or a combination thereof.

In some examples, the transmission muting component 740 may be configured as or otherwise support a means for refraining from communicating at least one message via the at least one communication link for the time duration. In some examples, the control message receiving component 725 may be configured as or otherwise support a means for receiving a second control message indicating whether communications between the first UE and a second UE on the at least one communication link are muted.

In some examples, the transmission muting component 740 may be configured as or otherwise support a means for determining whether transmission of one or more additional messages between the first UE and the second UE are muted based on the second control message.

In some examples, the transmission muting component 740 may be configured as or otherwise support a means for refraining from communicating at least one message via the at least one communication link for the time duration. In some examples, the communication resuming component 745 may be configured as or otherwise support a means for resuming the communications via the at least one communication link based on an expiration of a timer associated with the time duration.

In some examples, the control message receiving component 725 may be configured as or otherwise support a means for receiving a second control message indicating the time duration. In some examples, the time duration includes a quantity of symbols, a quantity of slots, a quantity of frames, or any combination thereof. In some examples, the time duration is based on a request from the first UE, a charging rate of the first UE, an energy capacity of the first UE, a discharging rate of the first UE, a power level of the first UE, or any combination thereof.

In some examples, the transmission muting component 740 may be configured as or otherwise support a means for refraining from communicating at least one message via the at least one communication link. In some examples, the control message receiving component 725 may be configured as or otherwise support a means for receiving a second control message that includes an indication to resume communications between the first UE and the second UE. In some examples, the communication resuming component 745 may be configured as or otherwise support a means for resuming the communications via the at least one communication link based on the second control message.

In some examples, the communication resuming component 745 may be configured as or otherwise support a means for transmitting a request to resume communications via the at least one communication link, where the indication to mute the communications is valid until the first UE transmits the request, the second control message being received in response to the request. In some examples, the indication to mute the communications includes an indication to mute all communications from the first UE, mute all communications to the second UE, or both.

In some examples, the transmission muting component 740 may be configured as or otherwise support a means for determining that transmission of one or more additional messages to a wireless device via an access link is muted based on the indication to mute the communications.

In some examples, the indication to mute the communications is associated with cancelation of transmissions to a wireless device, cancelation of transmissions from the wireless device, cancelation of reception at the wireless device, cancelation of reception from the wireless device, or a combination thereof.

In some examples, the message transmitting component 750 may be configured as or otherwise support a means for transmitting a message that indicates a power status of the first UE, where receiving the control message is based on the power status of the first UE.

In some examples, the message transmitting component 750 may be configured as or otherwise support a means for transmitting a request to mute all transmissions from the first UE for the time duration, where receiving the control message is based on the request.

In some examples, the message transmitting component 750 may be configured as or otherwise support a means for transmitting a request to mute all transmissions to the first UE for the time duration, where receiving the control message is based on the request.

In some examples, the circuit deactivating component 755 may be configured as or otherwise support a means for deactivating one or more RF circuits of the first UE after determining that the at least one communication link is muted.

In some examples, receiving the indication is based on a reliability metric associated with the at least one communication link, a transmit power of a second UE accessing the at least one communication link, or both.

In some examples, the indication to mute the communications is received from a network entity, a PLC, or a UE. In some examples, the indication to mute the communications is received via a sidelink channel, an uplink channel, a downlink channel, a set of dedicated resources, or a combination thereof.

Figure 8:
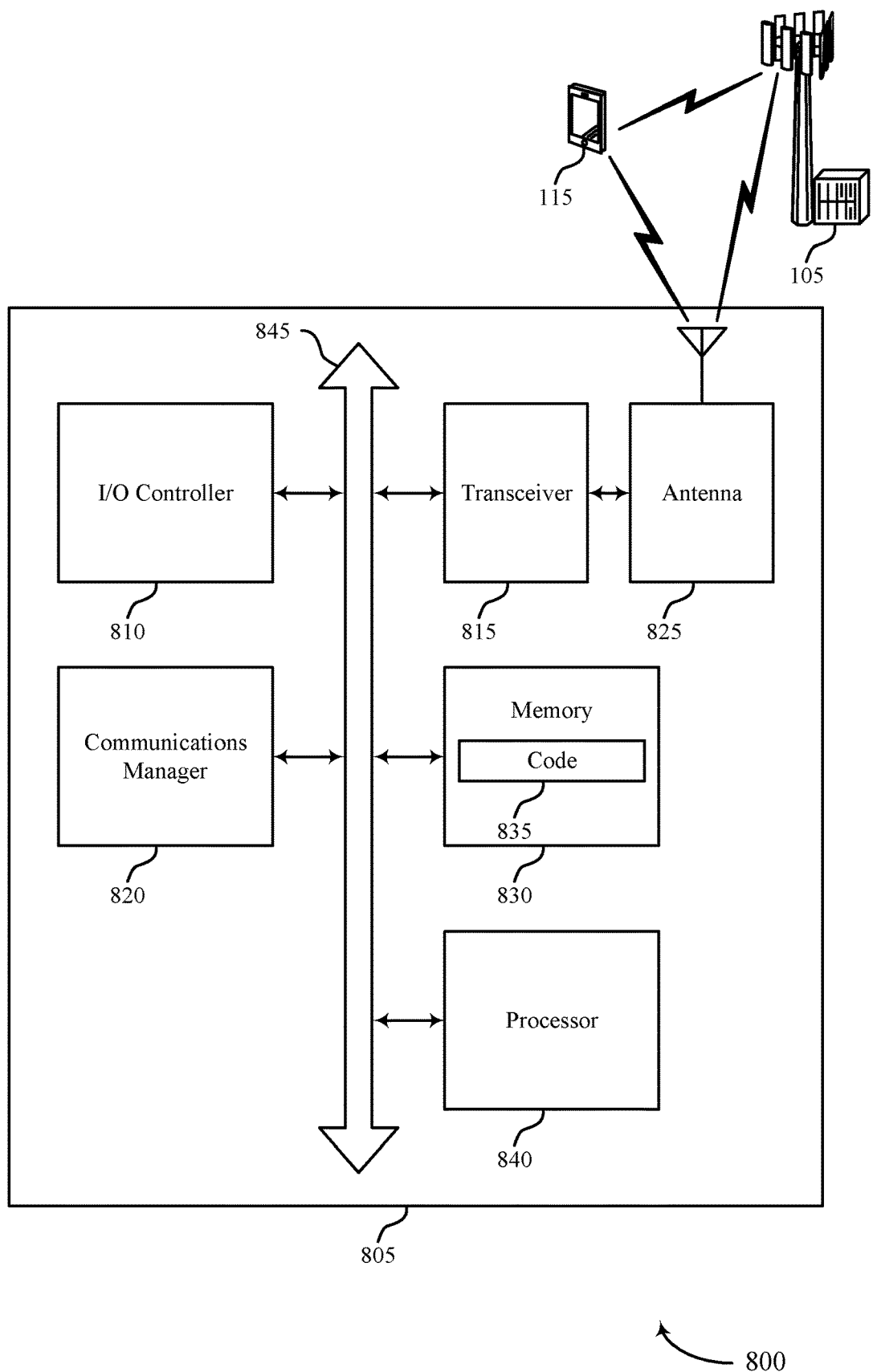
FIG. 8 shows a diagram of a system including a device that supports muting and cancelation techniques in accordance with one or more aspects of the present disclosure.

FIG. 8 shows a diagram of a system 800 including a device 805 that supports muting and cancelation techniques in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting muting and cancelation techniques). For example, the device 805 or a component of the device 805 may include a processor 840 and memory 830 coupled with or to the processor 840, the processor 840 and memory 830 configured to perform various functions described herein.

The communications manager 820 may support wireless communication at a first UE (the device 805) in accordance with examples disclosed herein. For example, the communications manager 820 may be configured as or otherwise support a means for receiving a control message that includes an indication to mute communications between the first UE and a second UE, where the indication to mute the communications between the first UE and the second UE is applicable to at least one communication link of one or more communication links between the first UE and the second UE. The communications manager 820 may be configured as or otherwise support a means for determining that the at least one communication link of the one or more communication links between the first UE and the second UE is muted for a time duration based on the indication to mute the communications between the first UE and the second UE.

By including or configuring the communications manager 820 in accordance with examples as described herein, the device 805 may support techniques for relatively lower communication resource overhead, relatively lower power consumption, and relatively greater communication reliability, among other benefits. For example, if a controlling device (e.g., a network entity, PLC, or primary UE) receives a muting request from the device 805 (e.g., a low-power communication device), the controlling device may mute all communications to and from the device 805 for a time duration by transmitting a muting indication to the device 805. Accordingly, the device 805 may cease communications and deactivate one or more RF circuits to conserve power (or recharge).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of muting and cancelation techniques as described herein, or the processor 840 and the memory 830 may be otherwise configured to perform or support such operations.

Figure 9:
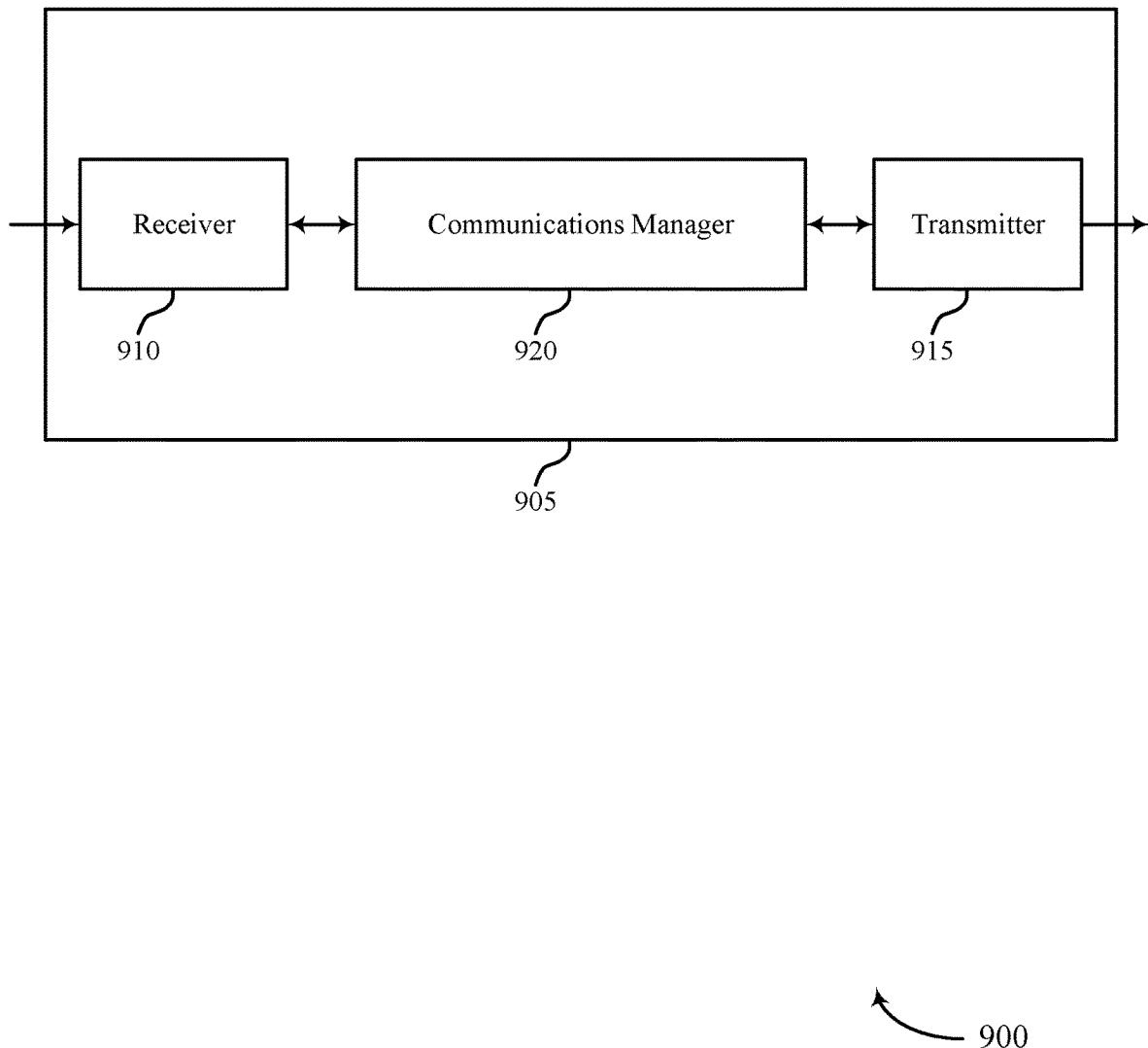
FIGS. 9 and 10 show block diagrams of devices that support muting and cancelation techniques in accordance with one or more aspects of the present disclosure.

FIG. 9 shows a block diagram 900 of a device 905 that supports muting and cancelation techniques in accordance with one or more aspects of the present disclosure. The device 905 may be an example of aspects of a wireless device as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of muting and cancelation techniques as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a wireless device (the device 905) in accordance with examples disclosed herein. For example, the communications manager 920 may be configured as or otherwise support a means for determining, based on monitoring one or more communication links, that a first UE and a second UE are communicating via the one or more communication links. The communications manager 920 may be configured as or otherwise support a means for transmitting, based on determining that the first UE and the second UE are communicating via the one or more communication links, a control message that includes an indication to mute communications between the first UE and the second UE for a time duration, where the indication is applicable to at least one communication link of the one or more communication links.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for relatively lower communication resource overhead, relatively lower power consumption, and relatively greater communication reliability. For example, the techniques described herein may enable the device 905 to mute transmissions from one or more communication devices on a communication link. As a result, the device 905 may access the communication link with relatively greater reliability.

Figure 10:
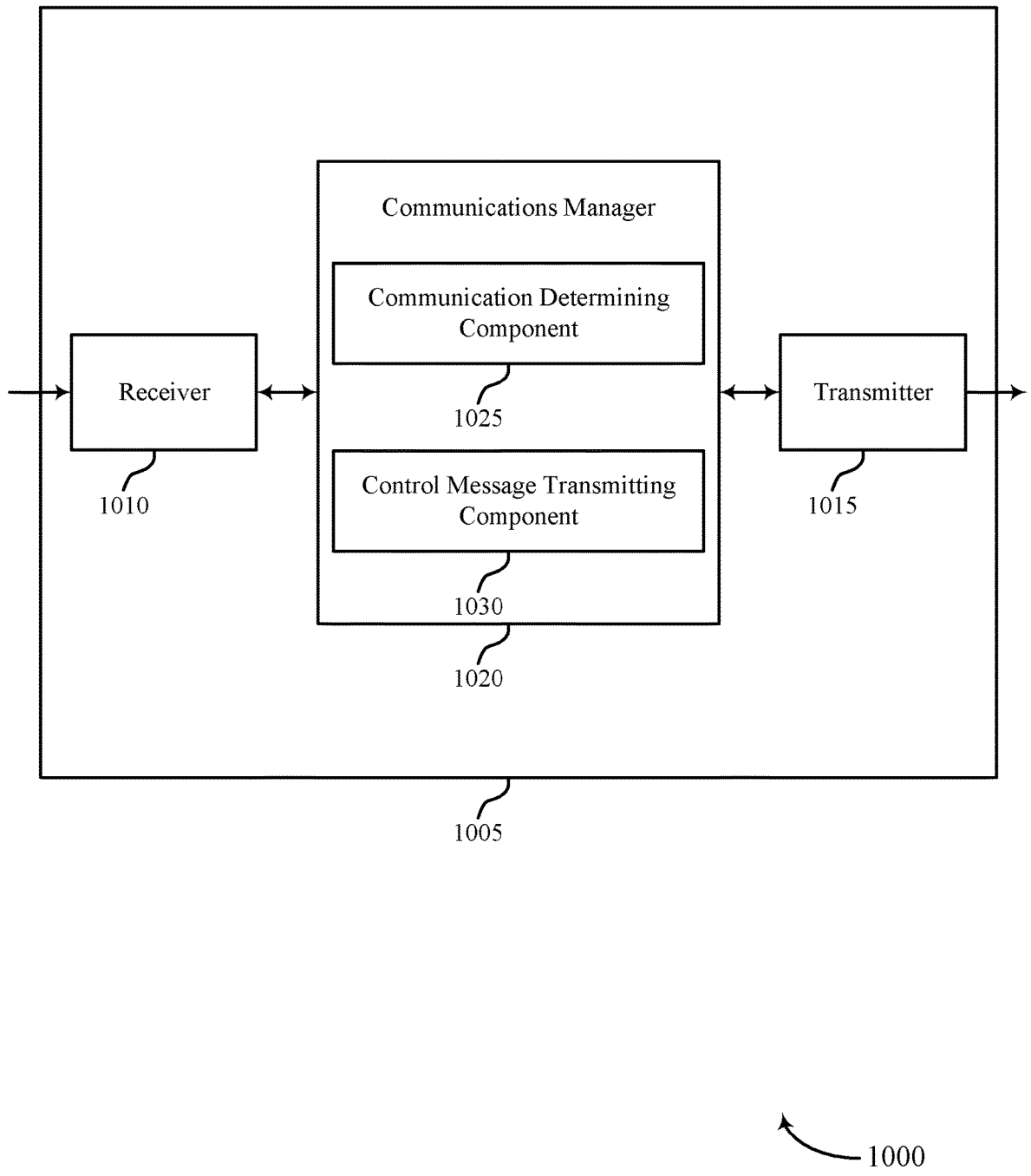

FIG. 10 shows a block diagram 1000 of a device 1005 that supports muting and cancelation techniques in accordance with one or more aspects of the present disclosure. The device 1005 may be an example of aspects of a device 905, a UE 115, or a network entity 105, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of muting and cancelation techniques as described herein. For example, the communications manager 1020 may include a communication determining component 1025 a control message transmitting component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a wireless device (the device 1005) in accordance with examples disclosed herein. The communication determining component 1025 may be configured as or otherwise support a means for determining, based on monitoring one or more communication links, that a first UE and a second UE are communicating via the one or more communication links. The control message transmitting component 1030 may be configured as or otherwise support a means for transmitting, based on determining that the first UE and the second UE are communicating via the one or more communication links, a control message that includes an indication to mute communications between the first UE and the second UE for a time duration, where the indication is applicable to at least one communication link of the one or more communication links.

Figure 11:
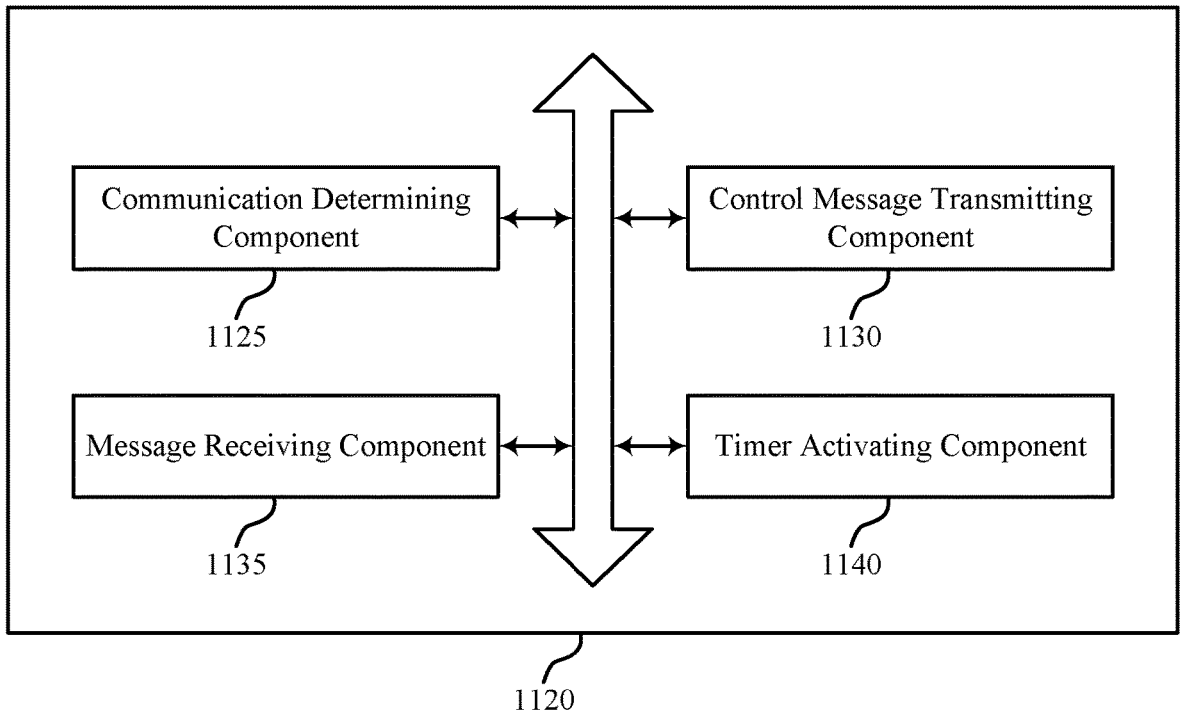
FIG. 11 shows a block diagram of a communications manager that supports muting and cancelation techniques in accordance with one or more aspects of the present disclosure.

FIG. 11 shows a block diagram 1100 of a communications manager 1120 that supports muting and cancelation techniques in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of muting and cancelation techniques as described herein. For example, the communications manager 1120 may include a communication determining component 1125, a control message transmitting component 1130, a message receiving component 1135, a timer activating component 1140, or any combination thereof. Each of these components may communicate, directly or indirectly, with one another (e.g., via one or more buses).

The communications manager 1120 may support wireless communication at a wireless device in accordance with examples disclosed herein. The communication determining component 1125 may be configured as or otherwise support a means for determining, based on monitoring one or more communication links, that a first UE and a second UE are communicating via the one or more communication links. The control message transmitting component 1130 may be configured as or otherwise support a means for transmitting, based on determining that the first UE and the second UE are communicating via the one or more communication links, a control message that includes an indication to mute communications between the first UE and the second UE for a time duration, where the indication is applicable to at least one communication link of the one or more communication links.

In some examples, to support transmitting the control message, the control message transmitting component 1130 may be configured as or otherwise support a means for transmitting the indication to mute the communications between the first UE and the second UE based on a power status of the first UE, a power status of the second UE, a reliability metric associated with the at least one communication link, an interference level measured by the wireless device, or a combination thereof.

In some examples, the message receiving component 1135 may be configured as or otherwise support a means for receiving a message that indicates a power status of the first UE, where transmitting the control message is based on the power status of the first UE.

In some examples, the message receiving component 1135 may be configured as or otherwise support a means for receiving a request to mute all transmissions from the first UE for the time duration, where transmitting the control message is based on the request.

In some examples, the message receiving component 1135 may be configured as or otherwise support a means for receiving a request to mute all transmissions to the first UE for the time duration, where transmitting the control message is based on the request.

In some examples, the control message further indicates a first communication link identifier associated with a first communication link of the one or more communication links. In some examples, at least one message to be transmitted via the first communication link is muted based on the first communication link identifier and the indication to mute the communications.

In some examples, the control message further indicates multiple communication link identifiers associated with multiple communication links. In some examples, transmission of two or more messages via the multiple communication links are muted based on the multiple communication link identifiers and the indication to mute the communications.

In some examples, the control message further indicates a device identifier. In some examples, communication of at least one message between the first UE and the second UE is muted based on an association between the device identifier and the at least one message.

In some examples, transmission of at least one message via a first communication link is muted based on a mapping between the device identifier and a first communication link identifier indicated by the control message.

In some examples, the message receiving component 1135 may be configured as or otherwise support a means for receiving, from the first UE or the second UE, a request to resume communications via the at least one communication link, where the indication to mute the communications is valid until the request is received.

In some examples, the control message transmitting component 1130 may be configured as or otherwise support a means for transmitting a second control message that includes an indication to resume communications between the first UE and the second UE, where the second control message is transmitted in response to the request. In some examples, the control message transmitting component 1130 may be configured as or otherwise support a means for transmitting a second control message indicating the time duration.

In some examples, the timer activating component 1140 may be configured as or otherwise support a means for activating a timer in response to transmitting the control message, where the indication to mute the communications is valid for a duration of the timer. In some examples, the time duration includes a quantity of symbols, a quantity of slots, a quantity of frames, or any combination thereof.

In some examples, the time duration is based on a request from the first UE, a charging rate of the first UE, an energy capacity of the first UE, a discharging rate of the first UE, a power status of the first UE, or a combination thereof. In some examples, the indication mutes all transmissions to the first UE and all transmissions from the first UE.

Figure 12:
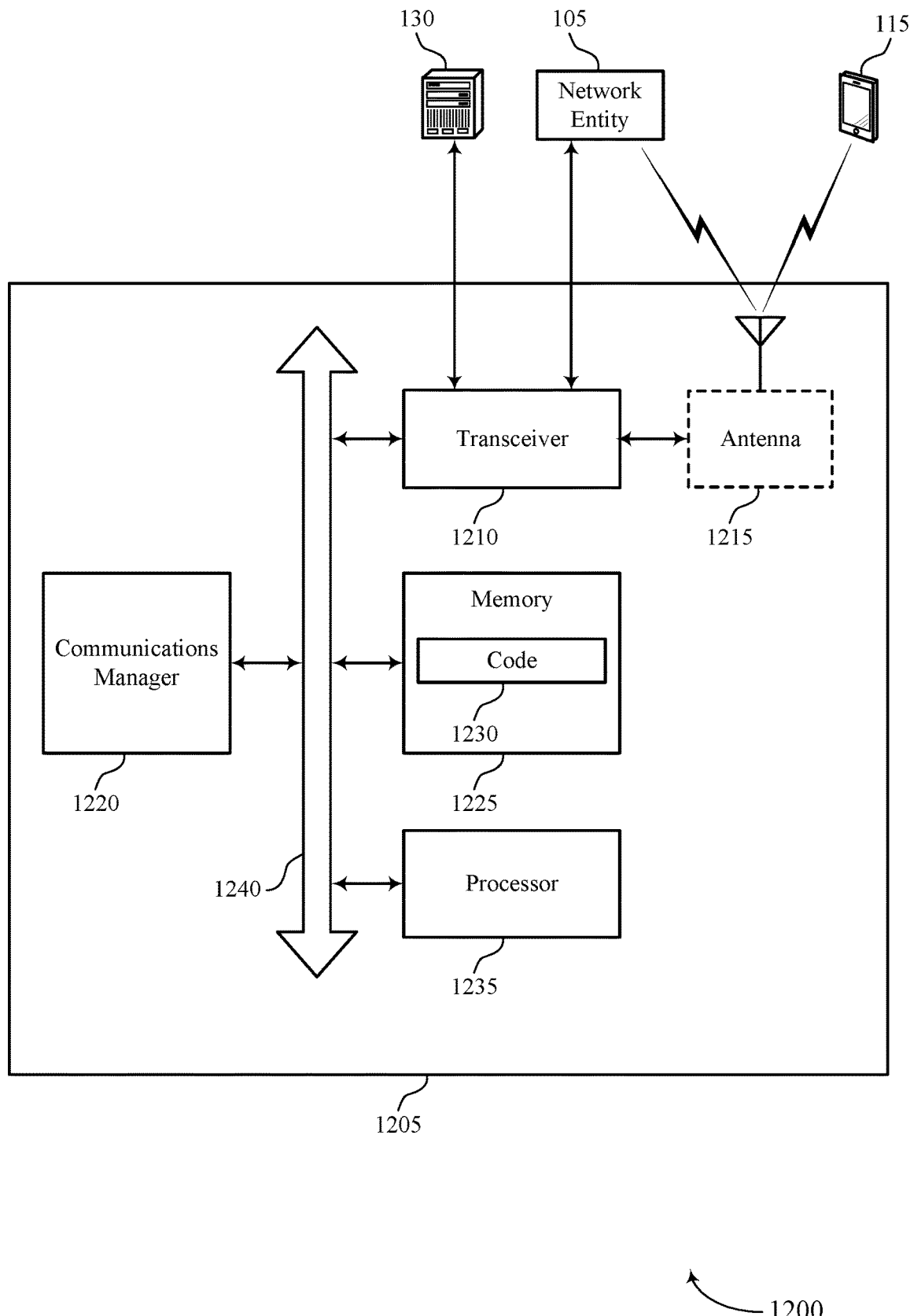
FIG. 12 shows a diagram of a system including a device that supports muting and cancelation techniques in accordance with one or more aspects of the present disclosure.

FIG. 12 shows a diagram of a system 1200 including a device 1205 that supports muting and cancelation techniques in accordance with one or more aspects of the present disclosure. The device 1205 may be an example of or include the components of a device 905, a device 1005, or a wireless device as described herein. The device 1205 may include components for bi-directional voice and data communications including components for transmitting and receiving communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals.

In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting muting and cancelation techniques). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

The processor 1235 may be any one or more processors capable of executing scripts or instructions of one or more software programs stored in the device 1205 (such as within the memory 1225). In some implementations, the processor 1235 may be a component of a processing system. A processing system may refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations.

In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a wireless device (the device 1205) in accordance with examples disclosed herein. For example, the communications manager 1220 may be configured as or otherwise support a means for determining, based on monitoring one or more communication links, that a first UE and a second UE are communicating via the one or more communication links. The communications manager 1220 may be configured as or otherwise support a means for transmitting, based on determining that the first UE and the second UE are communicating via the one or more communication links, a control message that includes an indication to mute communications between the first UE and the second UE for a time duration, where the indication is applicable to at least one communication link of the one or more communication links.

By including or configuring the communications manager 1220 in accordance with examples as described herein, the device 1205 may support techniques for lower communication resource overhead, relatively lower power consumption, and relatively greater communication reliability, among other benefits. For example, if the device 1205 receives an indication that a low-power communication device is running low on battery, the device 1205 may mute all transmissions to or from the low-power communication device and re-allocate resources (previously allocated for these transmissions) to other communication devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of muting and cancelation techniques as described herein, or the processor 1235 and the memory 1225 may be otherwise configured to perform or support such operations.

Figure 13:
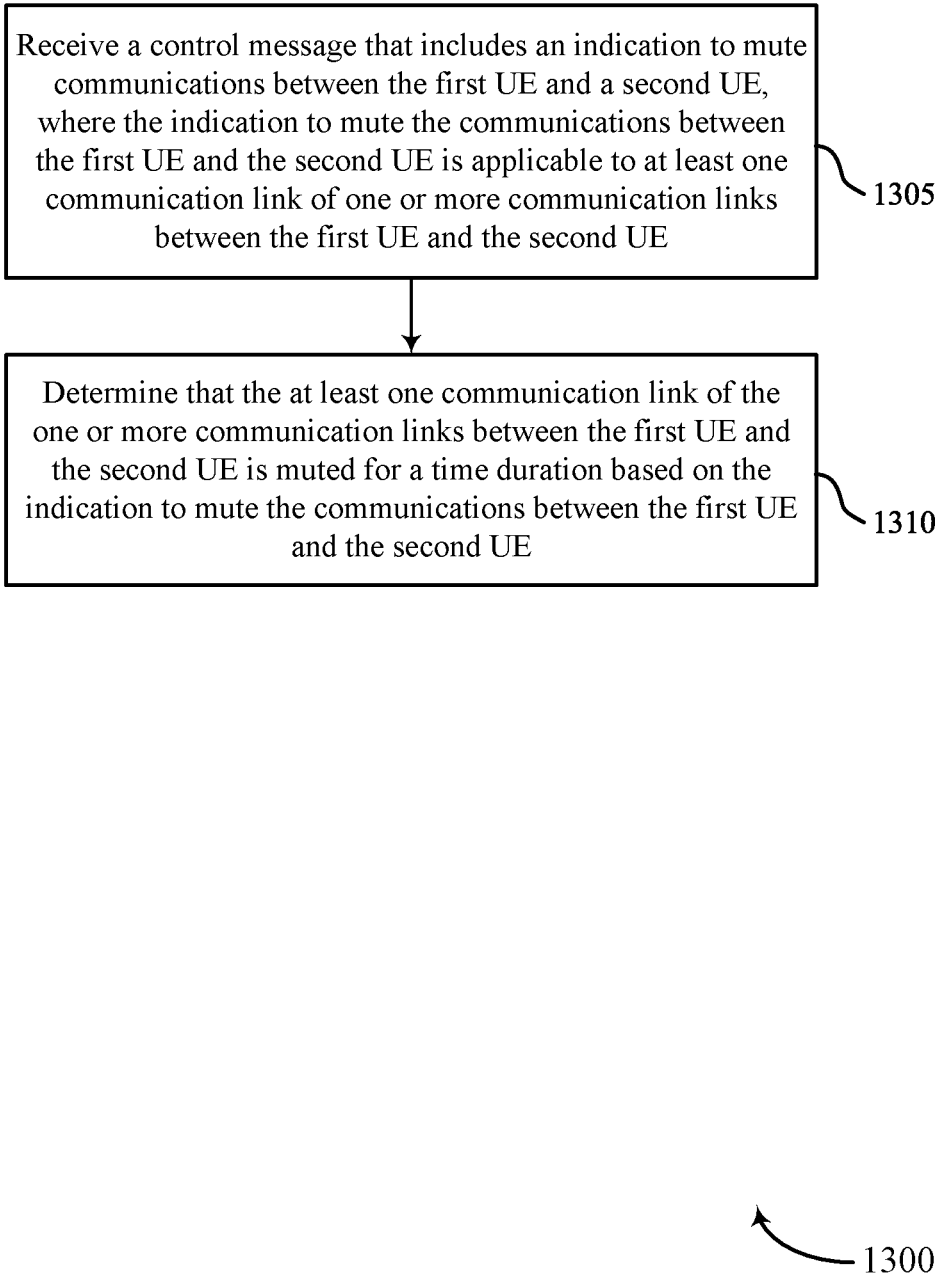
FIGS. 13 through 16 show flowcharts illustrating methods that support muting and cancelation techniques in accordance with one or more aspects of the present disclosure.

FIG. 13 shows a flowchart illustrating a method 1300 that supports muting and cancelation techniques in accordance with one or more aspects of the present disclosure. The operations of the method 1300 may be implemented by a UE or components thereof. For example, operations of the method 1300 may be performed by a UE 115, as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, a first UE may receive a control message that includes an indication to mute communications between the first UE and a second UE, where the indication to mute the communications between the first UE and the second UE is applicable to at least one communication link of one or more communication links between the first UE and the second UE. The operations of 1305 may be performed in accordance with examples disclosed herein. In some examples, aspects of the operations of 1305 may be performed by a control message receiving component 725, as described with reference to FIG. 7.

At 1310, the first UE may determine that the at least one communication link of the one or more communication links between the first UE and the second UE is muted for a time duration based on the indication to mute the communications between the first UE and the second UE. The operations of 1310 may be performed in accordance with examples disclosed herein. In some examples, aspects of the operations of 1310 may be performed by a communication link muting component 730, as described with reference to FIG. 7.

Figure 14:
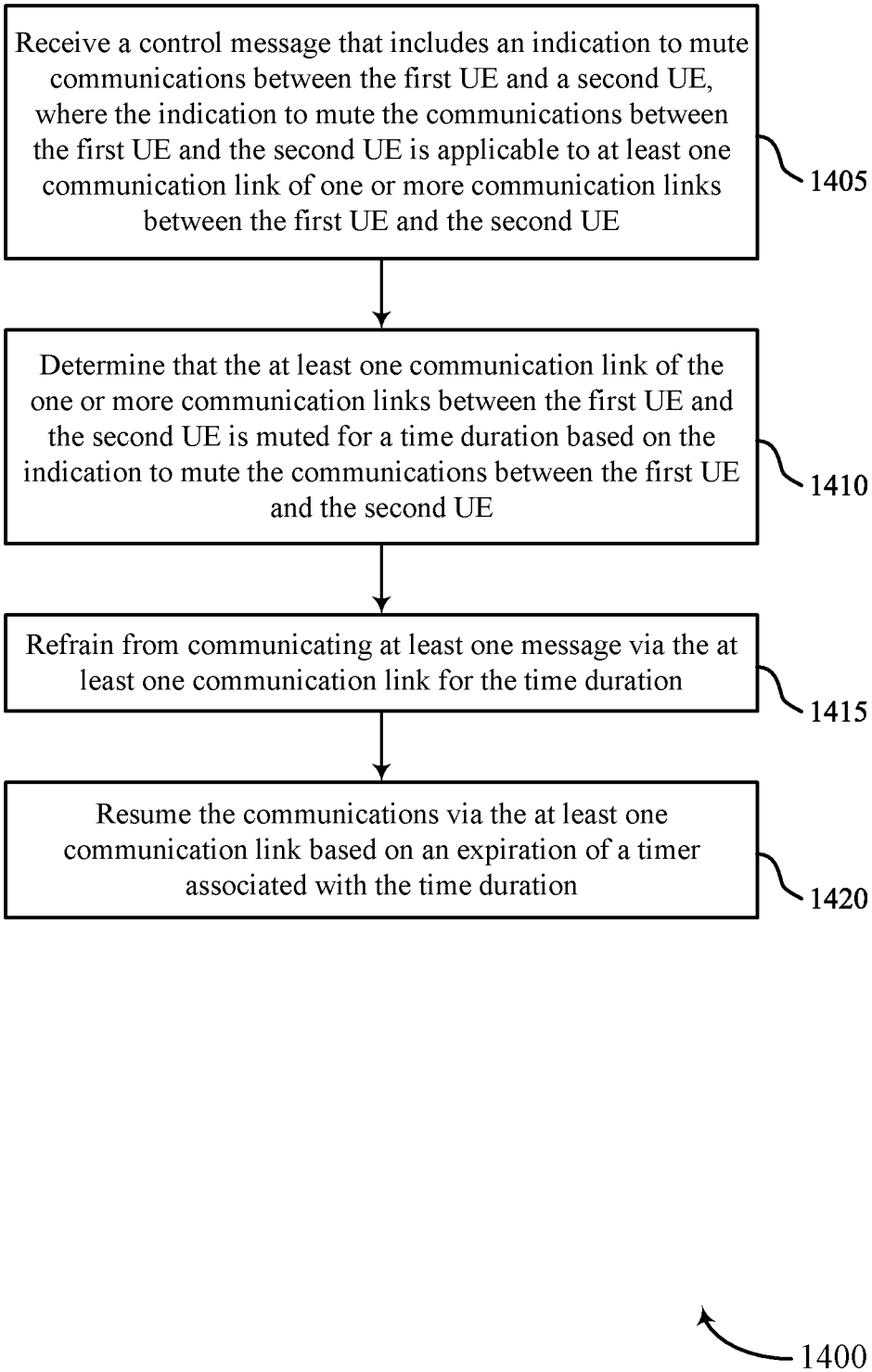

FIG. 14 shows a flowchart illustrating a method 1400 that supports muting and cancelation techniques in accordance with one or more aspects of the present disclosure. The operations of the method 1400 may be implemented by a UE or components thereof. For example, the operations of the method 1400 may be performed by a UE 115, as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, a first UE may receive a control message that includes an indication to mute communications between the first UE and a second UE, where the indication to mute the communications between the first UE and the second UE is applicable to at least one communication link of one or more communication links between the first UE and the second UE. The operations of 1405 may be performed in accordance with examples disclosed herein. In some examples, aspects of the operations of 1405 may be performed by a control message receiving component 725, as described with reference to FIG. 7.

At 1410, the first UE may determine that the at least one communication link of the one or more communication links between the first UE and the second UE is muted for a time duration based on the indication to mute the communications between the first UE and the second UE. The operations of 1410 may be performed in accordance with examples disclosed herein. In some examples, aspects of the operations of 1410 may be performed by a communication link muting component 730, as described with reference to FIG. 7.

At 1415, the first UE may refrain from communicating at least one message via the at least one communication link for the time duration. The operations of 1415 may be performed in accordance with examples disclosed herein. In some examples, aspects of the operations of 1415 may be performed by a transmission muting component 740, as described with reference to FIG. 7.

At 1420, the first UE may resume the communications via the at least one communication link based on an expiration of a timer associated with the time duration. The operations of 1420 may be performed in accordance with examples disclosed herein. In some examples, aspects of the operations of 1420 may be performed by a communication resuming component 745, as described with reference to FIG. 7.

Figure 15:
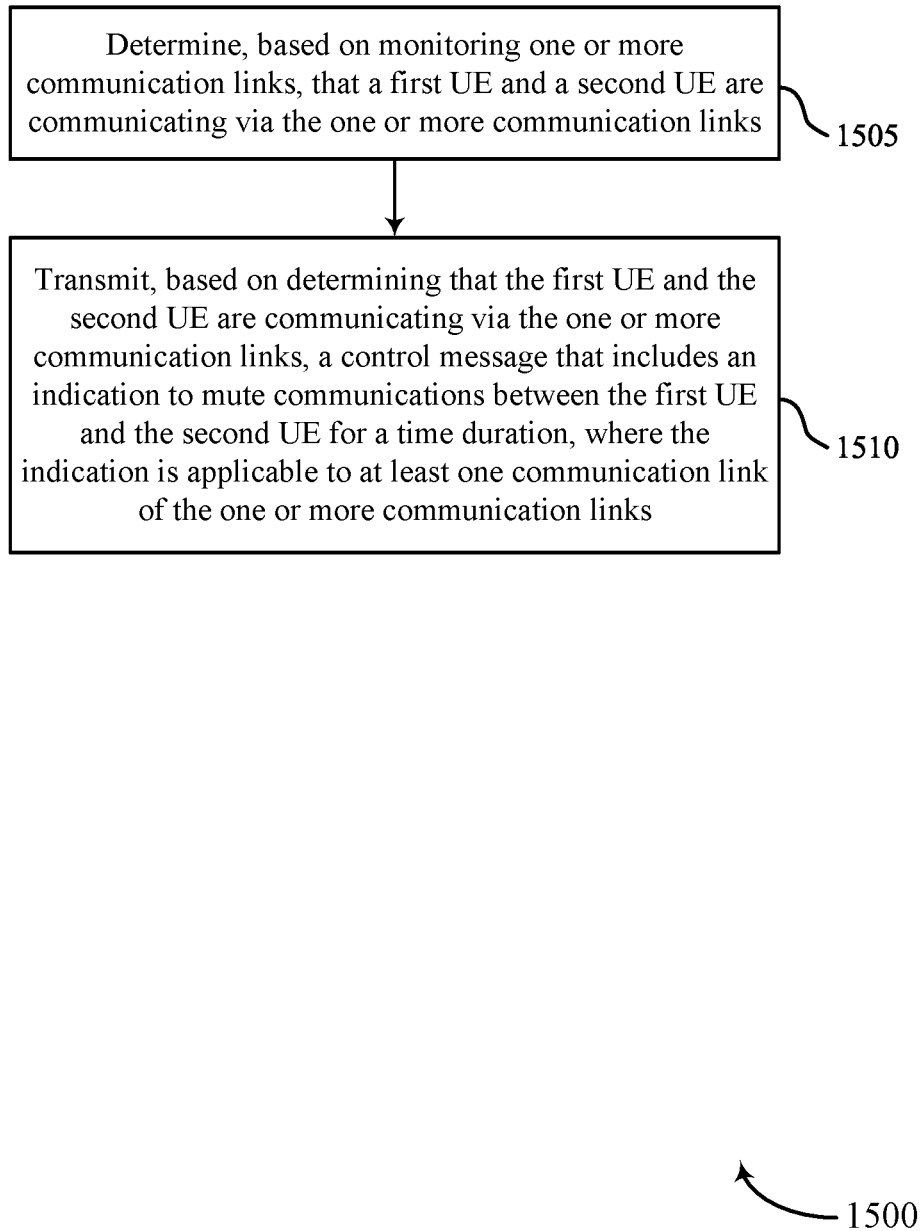

FIG. 15 shows a flowchart illustrating a method 1500 that supports muting and cancelation techniques in accordance with one or more aspects of the present disclosure. The operations of the method 1500 may be implemented by a wireless device or components thereof. For example, the operations of the method 1500 may be performed by a network entity 105 or a UE 115, as described with reference to FIGS. 1 through 12. In some examples, a wireless device may execute a set of instructions to control the functional elements of the wireless device to perform the described functions. Additionally, or alternatively, the wireless device may perform aspects of the described functions using special-purpose hardware.

At 1505, the wireless device may determine, based on monitoring one or more communication links, that a first UE and a second UE are communicating via the one or more communication links. The operations of 1505 may be performed in accordance with examples disclosed herein. In some examples, aspects of the operations of 1505 may be performed by a communication determining component 1125, as described with reference to FIG. 11.

At 1510, the wireless device may transmit, based on determining that the first UE and the second UE are communicating via the one or more communication links, a control message that includes an indication to mute communications between the first UE and the second UE for a time duration, where the indication is applicable to at least one communication link of the one or more communication links. The operations of 1510 may be performed in accordance with examples disclosed herein. In some examples, aspects of the operations of 1510 may be performed by a control message transmitting component 1130, as described with reference to FIG. 11.

Figure 16:
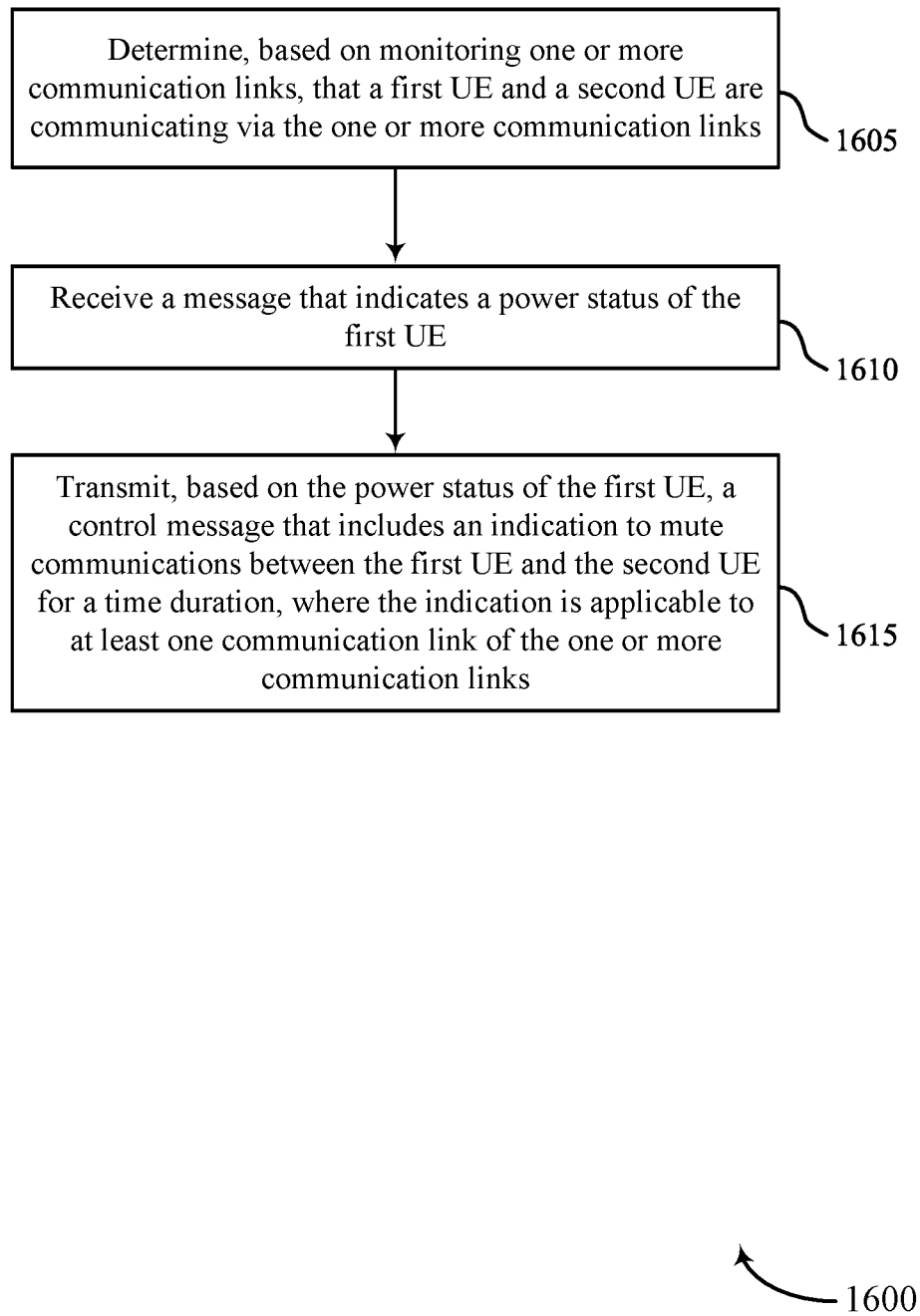

FIG. 16 shows a flowchart illustrating a method 1600 that supports muting and cancelation techniques in accordance with one or more aspects of the present disclosure. The operations of the method 1600 may be implemented by a wireless device or components thereof. For example, the operations of the method 1600 may be performed by a UE 115 or a network entity 105, as described with reference to FIGS. 1 through 12. In some examples, a wireless device may execute a set of instructions to control the functional elements of the wireless device to perform the described functions. Additionally, or alternatively, the wireless device may perform aspects of the described functions using special-purpose hardware.

At 1605, the wireless device may determine, based on monitoring one or more communication links, that a first UE and a second UE are communicating via the one or more communication links. The operations of 1605 may be performed in accordance with examples disclosed herein. In some examples, aspects of the operations of 1605 may be performed by a communication determining component 1125, as described with reference to FIG. 11.

At 1610, the wireless device may receive a message that indicates a power status of the first UE. The operations of 1610 may be performed in accordance with examples disclosed herein. In some examples, aspects of the operations of 1610 may be performed by a message receiving component 1135, as described with reference to FIG. 11.

At 1615, the wireless device may transmit, based on the power status of the first UE, a control message that includes an indication to mute communications between the first UE and the second UE for a time duration, where the indication is applicable to at least one communication link of the one or more communication links. The operations of 1615 may be performed in accordance with examples disclosed herein. In some examples, aspects of the operations of 1615 may be performed by a control message transmitting component 1130, as described with reference to FIG. 11.

The following provides an overview of aspects of the present disclosure:

Aspect 1: A method for wireless communication at a first UE, comprising: receiving a control message that comprises an indication to mute communications between the first UE and a second UE, wherein the indication to mute the communications between the first UE and the second UE is applicable to at least one communication link of one or more communication links between the first UE and the second UE; and determining that the at least one communication link of the one or more communication links between the first UE and the second UE is muted for a time duration based at least in part on the indication to mute the communications between the first UE and the second UE.

Aspect 2: The method of aspect 1, wherein determining that the at least one communication link is muted comprises: determining that a transmission of at least one message from the first UE to the second UE is muted based at least in part on the indication; and canceling the transmission of the at least one message in response to receiving the control message.

Aspect 3: The method of any of aspect 1, wherein determining that the at least one communication link is muted comprises: determining that a transmission of at least one message from the first UE to the second UE is muted based at least in part on the indication; and refraining from transmitting the at least one message after one or more scheduled messages are transmitted by the first UE.

Aspect 4: The method of any of aspects 1 through 3, wherein determining that the at least one communication link is muted comprises: determining that a transmission of at least one message from the second UE to the first UE is muted for the time duration based at least in part on the indication.

Aspect 5: The method of any of aspects 1 through 4, wherein the control message further indicates a first communication link identifier associated with a first communication link of the one or more communication links, and wherein determining that the at least one communication link is muted comprises: determining that a transmission of at least one message via the first communication link is muted based at least in part on the first communication link identifier and the indication to mute the communications.

Aspect 6: The method of any of aspects 1 through 4, wherein the control message further indicates a plurality of communication link identifiers associated with a respective plurality of communication links, and wherein determining that the at least one communication link is muted comprises: determining that transmission of two or more messages via the respective plurality of communication links is muted based at least in part on the plurality of communication link identifiers and the indication to mute the communications.

Aspect 7: The method of any of aspects 1 through 4, wherein the control message further indicates a device identifier, and wherein determining that the at least one communication link is muted comprises: determining that a transmission of at least one message to the second UE or reception of at least one message from the second UE is muted based at least in part on an association between the device identifier and the second UE; and refraining from communicating the at least one message based at least in part on the device identifier and the indication to mute the communications.

Aspect 8: The method of aspect 7, further comprising: determining that the indication is applicable to the first UE based at least in part on an association between the device identifier and one or more of a Layer 1 identifier of the first UE, a Layer 2 identifier of the first UE, a permanent identifier of the first UE, a universal identifier of the first UE, or a network-configured identifier of the first UE, or any combination thereof.

Aspect 9: The method of any of aspects 7 through 8, wherein determining that the at least one communication link is muted further comprises: determining that transmission of at least one message via a first communication link is muted based at least in part on the indication to mute the communications, a mapping between the device identifier and a first communication link identifier indicated by the control message, an association between the first communication link identifier and the first communication link, or a combination thereof.

Aspect 10: The method of any of aspects 1 through 9, further comprising: refraining from communicating at least one message via the at least one communication link for the time duration; receiving a second control message indicating whether communications between the first UE and a second UE on the at least one communication link are muted; and determining whether transmission of one or more additional messages between the first UE and the second UE are muted based at least in part on the second control message.

Aspect 11: The method of any of aspects 1 through 9, further comprising: refraining from communicating at least one message via the at least one communication link for the time duration; and resuming the communications with the second UE via the at least one communication link based at least in part on an expiration of a timer associated with the time duration.

Aspect 12: The method of aspect 11, further comprising: receiving a second control message indicating the time duration.

Aspect 13: The method of any of aspects 11 through 12, wherein the time duration comprises a quantity of symbols, a quantity of slots, a quantity of frames, or any combination thereof.

Aspect 14: The method of any of aspects 11 through 13, wherein the time duration is based at least in part on a request from the first UE, a charging rate of the first UE, an energy capacity of the first UE, a discharging rate of the first UE, a power level of the first UE, or any combination thereof.

Aspect 15: The method of any of aspects 1 through 14, further comprising: refraining from communicating at least one message via the at least one communication link; receiving a second control message comprising an indication to resume communications between the first UE and the second UE; and resuming the communications with the second UE via the at least one communication link based at least in part on the second control message.

Aspect 16: The method of aspect 15, further comprising: transmitting a request to resume communications with the second UE via the at least one communication link, wherein the indication to mute the communications is valid until the first UE transmits the request, and wherein the second control message is received in response to the request.

Aspect 17: The method of any of aspects 1 through 16, wherein the indication to mute the communications comprises an indication to mute all communications from the first UE, all communications to the second UE, or both.

Aspect 18: The method of any of aspects 1 through 17, further comprising: determining that transmission of one or more additional messages to a wireless device via an access link is muted based at least in part on the indication to mute the communications.

Aspect 19: The method of any of aspects 1 through 18, wherein the indication to mute the communications is associated with cancelation of transmissions to a wireless device, cancelation of transmissions from the wireless device, cancelation of reception at the wireless device, cancelation of reception from the wireless device, or a combination thereof.

Aspect 20: The method of any of aspects 1 through 19, further comprising: transmitting a message that indicates a power status of the first UE, wherein receiving the control message is based at least in part on the power status of the first UE.

Aspect 21: The method of any of aspects 1 through 20, further comprising: transmitting a request to mute all transmissions from the first UE for the time duration, wherein receiving the control message is based at least in part on the request.

Aspect 22: The method of any of aspects 1 through 20, further comprising: transmitting a request to mute all transmissions to the first UE for the time duration, wherein receiving the control message is based at least in part on the request.

Aspect 23: The method of any of aspects 1 through 22, further comprising: deactivating one or more radio frequency circuits of the first UE after determining that the at least one communication link is muted.

Aspect 24: The method of any of aspects 1 through 23, wherein receiving the indication is based at least in part on a reliability metric associated with the at least one communication link, a transmit power of a UE accessing the at least one communication link, or both.

Aspect 25: The method of any of aspects 1 through 24, wherein the indication is received from a network entity, a programmable logic controller, or a UE.

Aspect 26: The method of any of aspects 1 through 25, wherein the indication is received via a sidelink channel, an uplink channel, a downlink channel, a set of dedicated resources, or a combination thereof.

Aspect 27: A method for wireless communication at a wireless device, comprising: determining, based at least in part on monitoring one or more communication links, that a first UE and a second UE are communicating via the one or more communication links; and transmitting, based at least in part on determining that the first UE and the second UE are communicating via the one or more communication links, a control message that comprises an indication to mute communications between the first UE and the second UE for a time duration, wherein the indication is applicable to at least one communication link of the one or more communication links.

Aspect 28: The method of aspect 27, wherein transmitting the control message comprises: transmitting the indication to mute the communications between the first UE and the second UE based at least in part on a power status of the first UE, a power status of the second UE, a reliability metric associated with the at least one communication link, an interference level measured by the wireless device, or a combination thereof.

Aspect 29: The method of any of aspects 27 through 28, further comprising: receiving a message that indicates a power status of the first UE, wherein transmission of the control message is based at least in part on the power status of the first UE.

Aspect 30: The method of any of aspects 27 through 29, further comprising: receiving a request to mute all transmissions from the first UE for the time duration, wherein transmission of the control message is based at least in part on the request.

Aspect 31: The method of any of aspects 27 through 29, further comprising: receiving a request to mute all transmissions to the first UE for the time duration, wherein transmission of the control message is based at least in part on the request.

Aspect 32: The method of any of aspects 27 through 31, wherein the control message further indicates a first communication link identifier associated with a first communication link of the one or more communication links; and at least one message to be transmitted via the first communication link is muted based at least in part on the first communication link identifier and the indication to mute the communications.

Aspect 33: The method of any of aspects 27 through 31, further comprising: the control message further indicates a plurality of communication link identifiers associated with a respective plurality of communication links; and transmission of two or more messages via the respective plurality of communication links is muted based at least in part on the plurality of communication link identifiers and the indication to mute the communications.

Aspect 34: The method of any of aspects 27 through 31, wherein the control message further indicates a device identifier; and communication of at least one message between the first UE and the second UE is muted based at least in part on an association between the device identifier and the at least one message.

Aspect 35: The method of aspect 34, wherein the indication mutes transmissions to the first UE and transmissions from the first UE if the device identifier corresponds to the first UE; and the indication mutes transmissions to the second UE and transmissions from the second UE if the device identifier corresponds to the second UE.

Aspect 36: The method of any of aspects 34 through 35, wherein transmission of at least one message via a first communication link is muted based at least in part on a mapping between the device identifier and a first communication link identifier indicated by the control message.

Aspect 37: The method of any of aspects 27 through 36, further comprising: receiving, from the first UE or the second UE, a request to resume communications via the at least one communication link, wherein the indication to mute the communications is valid until the request is received; and transmitting a second control message comprising an indication to resume communications between the first UE and the second UE, wherein the second control message is transmitted in response to the request.

Aspect 38: The method of any of aspects 27 through 37, further comprising: transmitting a second control message indicating the time duration.

Aspect 39: The method of any of aspects 27 through 38, further comprising: activating a timer in response to transmitting the control message, wherein the indication to mute the communications is valid for a duration of the timer.

Aspect 40: The method of any of aspects 27 through 39, wherein the time duration comprises a quantity of symbols, a quantity of slots, a quantity of frames, or any combination thereof.

Aspect 41: The method of any of aspects 27 through 40, wherein the time duration is based at least in part on a request from the first UE, a charging rate of the first UE, an energy capacity of the first UE, a discharging rate of the first UE, a power status of the first UE, or a combination thereof.

Aspect 42: The method of any of aspects 27 through 41, wherein the indication mutes all transmissions to the first UE and all transmissions from the first UE.

Aspect 43: An apparatus for wireless communication at a first UE, comprising a processor, memory coupled with the processor, and instructions stored in the memory and executable by the processor to cause the apparatus to perform a method of any of aspects 1 through 26.

Aspect 44: An apparatus for wireless communication at a first UE, comprising at least one means for performing a method of any of aspects 1 through 26.

Aspect 45: A non-transitory computer-readable medium storing code for wireless communication at a first UE, the code comprising instructions executable by a processor to perform a method of any of aspects 1 through 26.

Aspect 46: An apparatus for wireless communication at a wireless device, comprising a processor, memory coupled with the processor, and instructions stored in the memory and executable by the processor to cause the apparatus to perform a method of any of aspects 27 through 42.

Aspect 47: An apparatus for wireless communication at a wireless device, comprising at least one means for performing a method of any of aspects 27 through 42.

Aspect 48: A non-transitory computer-readable medium storing code for wireless communication at a wireless device, the code comprising instructions executable by a processor to perform a method of any of aspects 27 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor;
    memory coupled with the processor; and
    instructions stored in the memory and executable by the processor to cause the apparatus to:
        receive a control message that comprises an indication to mute communications between the first UE and a second UE, wherein the indication to mute the communications between the first UE and the second UE is applicable to at least one communication link of one or more communication links between the first UE and the second UE; and
        determine that the at least one communication link of the one or more communication links between the first UE and the second UE is muted for a time duration based at least in part on the indication to mute the communications between the first UE and the second UE, wherein the instructions to determine that the at least one communication link is muted are executable by the processor to cause the apparatus to:
            determine that a transmission of at least one message from the first UE to the second UE is muted based at least in part on the indication; and
            cancel the transmission of the at least one message in response to receiving the control message.

2. The apparatus of claim 1, wherein the instructions to determine that the at least one communication link is muted are executable by the processor to cause the apparatus to:
    determine that a transmission of at least one message from the second UE to the first UE is muted for the time duration based at least in part on the indication.

3. The apparatus of claim 1, wherein the control message further indicates a first communication link identifier associated with a first communication link of the one or more communication links, and wherein the instructions to determine that the at least one communication link is muted are executable by the processor to cause the apparatus to:
  determine that a transmission of at least one message via the first communication link is muted based at least in part on the first communication link identifier and the indication to mute the communications.

4. The apparatus of claim 1, wherein the control message further indicates a plurality of communication link identifiers associated with a respective plurality of communication links, and wherein the instructions to determine that the at least one communication link is muted are executable by the processor to cause the apparatus to:
  determine that transmission of two or more messages via the respective plurality of communication links is muted based at least in part on the plurality of communication link identifiers and the indication to mute the communications.

5. The apparatus of claim 1, wherein the control message further indicates a device identifier, and wherein the instructions to determine that the at least one communication link is muted are executable by the processor to cause the apparatus to:
  determine that a transmission of at least one message to the second UE or reception of at least one message from the second UE is muted based at least in part on an association between the device identifier and the second UE; and
  refrain from communicating the at least one message based at least in part on the device identifier and the indication to mute the communications.

6. The apparatus of claim 5, wherein the instructions are further executable by the processor to cause the apparatus to:
  determine that the indication is applicable to the first UE based at least in part on an association between the device identifier and one or more of a Layer 1 identifier of the first UE, a Layer 2 identifier of the first UE, a permanent identifier of the first UE, a universal identifier of the first UE, or a network-configured identifier of the first UE, or any combination thereof.

7. The apparatus of claim 5, wherein the instructions to determine that the at least one communication link is muted are further executable by the processor to cause the apparatus to:
  determine that transmission of at least one message via a first communication link is muted based at least in part on the indication to mute the communications, a mapping between the device identifier and a first communication link identifier indicated by the control message, an association between the first communication link identifier and the first communication link, or a combination thereof.

8. The apparatus of claim 1, wherein the instructions are further executable by the processor to cause the apparatus to:
  refrain from communicating at least one message via the at least one communication link for the time duration;
  receive a second control message indicating whether communications between the first UE and the second UE on the at least one communication link are muted; and
  determine whether transmission of one or more additional messages between the first UE and the second UE are muted based at least in part on the second control message.

9. The apparatus of claim 1, wherein the instructions are further executable by the processor to cause the apparatus to:
  refrain from communicating at least one message via the at least one communication link for the time duration; and
  resume the communications with the second UE via the at least one communication link based at least in part on an expiration of a timer associated with the time duration.

10. The apparatus of claim 9, wherein the time duration is based at least in part on a request from the first UE, a charging rate of the first UE, an energy capacity of the first UE, a discharging rate of the first UE, a power level of the first UE, or any combination thereof.

11. The apparatus of claim 1, wherein the instructions are further executable by the processor to cause the apparatus to:
  refrain from communicating at least one message via the at least one communication link;
  receive a second control message that comprises an indication to resume communications between the first UE and the second UE; and
  resume the communications via the at least one communication link based at least in part on the second control message.

12. The apparatus of claim 11, wherein the instructions are further executable by the processor to cause the apparatus to:
  transmit a request to resume communications via the at least one communication link, wherein the indication to mute the communications is valid until the first UE transmits the request, and wherein the second control message is received in response to the request.

13. The apparatus of claim 1, wherein the indication to mute the communications comprises an indication to mute all communications from the first UE, all communications to the second UE, or both.

14. The apparatus of claim 1, wherein the instructions are further executable by the processor to cause the apparatus to:
  determine that transmission of one or more additional messages to a wireless device via an access link is muted based at least in part on the indication to mute the communications.

15. The apparatus of claim 1, wherein the indication to mute the communications is associated with cancelation of transmissions to a wireless device, cancelation of transmissions from the wireless device, cancelation of reception at the wireless device, cancelation of reception from the wireless device, or a combination thereof.

16. The apparatus of claim 1, wherein the instructions are further executable by the processor to cause the apparatus to:
  transmit a message that indicates a power status of the first UE, wherein reception of the control message is based at least in part on the power status of the first UE.

17. The apparatus of claim 1, wherein the instructions are further executable by the processor to cause the apparatus to:
  transmit a request to mute all transmissions from the first UE and all transmissions to the first UE for the time duration, wherein reception of the control message is based at least in part on the request.

18. The apparatus of claim 1, wherein the instructions are further executable by the processor to cause the apparatus to:
  deactivate one or more radio frequency circuits of the first UE after determining that the at least one communication link is muted.

19. The apparatus of claim 1, wherein the indication to mute the communications is based at least in part on a reliability metric associated with the at least one communication link, a transmit power of a UE accessing the at least one communication link, or both.

20. An apparatus for wireless communication at a wireless device, comprising:
a processor;
memory coupled with the processor; and
instructions stored in the memory and executable by the processor to cause the apparatus to:
determine, based at least in part on monitoring one or more communication links, that a first user equipment (UE) and a second UE are communicating via the one or more communication links;
receive a message that indicates a power status of the first UE; and
transmit, based at least in part on determining that the first UE and the second UE are communicating via the one or more communication links, a control message that comprises an indication to mute communications between the first UE and the second UE for a time duration, wherein the indication is applicable to at least one communication link of the one or more communication links, wherein transmission of the control message is based at least in part on the power status of the first UE.

21. The apparatus of claim 20, wherein the instructions to transmit the control message are executable by the processor to cause the apparatus to:
transmit the indication to mute the communications between the first UE and the second UE based at least in part on the power status of the first UE, a power status of the second UE, a reliability metric associated with the at least one communication link, an interference level measured by the wireless device, or a combination thereof.

22. The apparatus of claim 20, wherein the instructions are further executable by the processor to cause the apparatus to:
receive a request to mute all transmissions to the first UE and all transmissions from the first UE for the time duration, wherein transmission of the control message is based at least in part on the request.

23. The apparatus of claim 20, wherein:
the control message further indicates a first communication link identifier associated with a first communication link of the one or more communication links; and
at least one message to be transmitted via the first communication link is muted based at least in part on the first communication link identifier and the indication to mute the communications.

24. The apparatus of claim 20, wherein the instructions are further executable by the processor to cause the apparatus to:
receive, from the first UE or the second UE, a request to resume communications via the at least one communication link, wherein the indication to mute the communications is valid until the request is received; and
transmit a second control message that comprises an indication to resume communications between the first UE and the second UE, wherein the second control message is transmitted in response to the request.

25. The apparatus of claim 20, wherein the instructions are further executable by the processor to cause the apparatus to:
activate a timer in response to transmitting the control message, wherein the indication to mute the communications is valid for a duration of the timer.

26. A method for wireless communication at a first user equipment (UE), comprising:
receiving a control message that comprises an indication to mute communications between the first UE and a second UE, wherein the indication to mute the communications between the first UE and the second UE is applicable to at least one communication link of one or more communication links between the first UE and the second UE; and
determining that the at least one communication link of the one or more communication links between the first UE and the second UE is muted for a time duration based at least in part on the indication to mute the communications between the first UE and the second UE, wherein determining that the at least one communication link is muted comprises:
determining that a transmission of at least one message from the first UE to the second UE is muted based at least in part on the indication; and
canceling the transmission of the at least one message in response to receiving the control message.

27. A method for wireless communication at a wireless device, comprising:
determining, based at least in part on monitoring one or more communication links, that a first user equipment (UE) and a second UE are communicating via the one or more communication links;
receive a message that indicates a power status of the first UE; and
transmitting, based at least in part on determining that the first UE and the second UE are communicating via the one or more communication links, a control message that comprises an indication to mute communications between the first UE and the second UE for a time duration, wherein the indication is applicable to at least one communication link of the one or more communication links, wherein transmission of the control message is based at least in part on the power status of the first UE.

* * * * *